US012634551B2

(12) United States Patent

Yang et al.

(10) Patent No.: US 12,634,551 B2

(45) Date of Patent: May 19, 2026

(54) DISPLAY APPARATUS AND DATA PROCESSING METHOD

(71) Applicant: HISENSE VISUAL TECHNOLOGY CO., LTD., Qingdao (CN)

(72) Inventors: Kun Yang, Qingdao (CN); Xiaosheng Jiang, Qingdao (CN); Zijing Deng, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/960,806

(22) Filed: Nov. 26, 2024

(65) Prior Publication Data

US 2025/0088704 A1 Mar. 13, 2025

Related U.S. Application Data

(63) Continuation of application No. PCT/CN2023/085056, filed on Mar. 30, 2023.

(30) Foreign Application Priority Data

Jun. 30, 2022 (CN) .......................... 202210771002.5
Jun. 30, 2022 (CN) .......................... 202210772655.5

(51) Int. Cl.
  *H04N 21/4363* (2011.01)
  *H04N 21/439* (2011.01)
  *H04W 76/11* (2018.01)

(52) U.S. Cl.
  CPC ... *H04N 21/43637* (2013.01); *H04N 21/4396* (2013.01); *H04W 76/11* (2018.02)

(58) Field of Classification Search
  CPC ........ H04N 21/43637; H04N 21/4396; H04W 76/11

See application file for complete search history.

(56) References Cited

U.S. PATENT DOCUMENTS 11,736,883 B2 * 8/2023 Lee .......................... H04S 7/301
                                                  381/303
2010/0303244 A1 * 12/2010 Kim ...................... H04H 20/33
                                                  381/2
                      (Continued)

FOREIGN PATENT DOCUMENTS

CN        110266508 A      9/2019
CN        110381197 A     10/2019
                      (Continued)

OTHER PUBLICATIONS

State Intellectual Property Office of China Notice of Registration Procedure, Notice of Grant of Invention Patent Right for Application No. 202210772655.5 Feb. 27, 2025 11 pages (including translation).

(Continued)

*Primary Examiner* — Mulugeta Mengesha

(74) *Attorney, Agent, or Firm* — Anova Law Group, PLLC

(57) ABSTRACT

Disclosed are a display apparatus and a data processing method. The display apparatus can include: a display, an audio playback module, a WiFi communication module, and a memory. A processor is connected with the display, the audio playback module, the WiFi communication module and the memory, and can be configured to execute computer instructions in the memory to cause the display apparatus to perform: determining a target Bluetooth device having the earliest occurrence time of microphone grabbing from at least one Bluetooth device; sending a microphone grabbing success indication to the target Bluetooth device, receiving a Broadcast Isochronous Stream, BIS, channel identifier sent from the target Bluetooth device after sending the microphone grabbing success indication; monitoring a target BIS channel indicated by the BIS channel identifier to receive a (Continued)

Receive an occurrence time of microphone grabbing sent from at least one Bluetooth device ~S701

Determine, from at least one Bluetooth device, a target Bluetooth device with the earliest occurrence time of the microphone grabbing ~S702

Send a microphone grabbing success indication to the target Bluetooth device, and after sending the microphone grabbing success indication, receive a BIS channel identifier sent from the target Bluetooth device ~S703

Monitor the target BIS channel indicated by the BIS channel identifier to receive the target BIS audio ~S704

Control the audio playback module to play the target BIS audio ~S705

901

902

Projection image data 911

Projection image data 912

C1

C2

903

Projection image data 913

Projection image data 914

C3

C4

904 target BIS audio; and controlling the audio playback module to play the target BIS audio.

12 Claims, 14 Drawing Sheets

(56) References Cited

U.S. PATENT DOCUMENTS

| | | | | |
|---|---|---|---|---|
| 2021/0306749 | A1* | 9/2021 | Young | H04S 3/008 |
| 2021/0400096 | A1 | 12/2021 | Lee et al. | |
| 2022/0201452 | A1 | 6/2022 | Lee et al. | |
| 2023/0269012 | A1* | 8/2023 | Dong | H04S 1/007 |
| | | | | 381/311 |

FOREIGN PATENT DOCUMENTS

| | | | |
|---|---|---|---|
| CN | 111913683 | A | 11/2020 |
| CN | 111935555 | A | 11/2020 |
| CN | 113450809 | A | 9/2021 |
| CN | 113766305 | A | 12/2021 |
| CN | 114125024 | A | 3/2022 |
| CN | 114371823 | A | 4/2022 |
| CN | 115278324 | A | 11/2022 |
| WO | 2022089088 | A1 | 5/2022 |

OTHER PUBLICATIONS

The World Intellectual Property Organization (WIPO) International Search Report for PCT/CN2023/085056 Jul. 11, 2023 6 Pages (including translation).

* cited by examiner

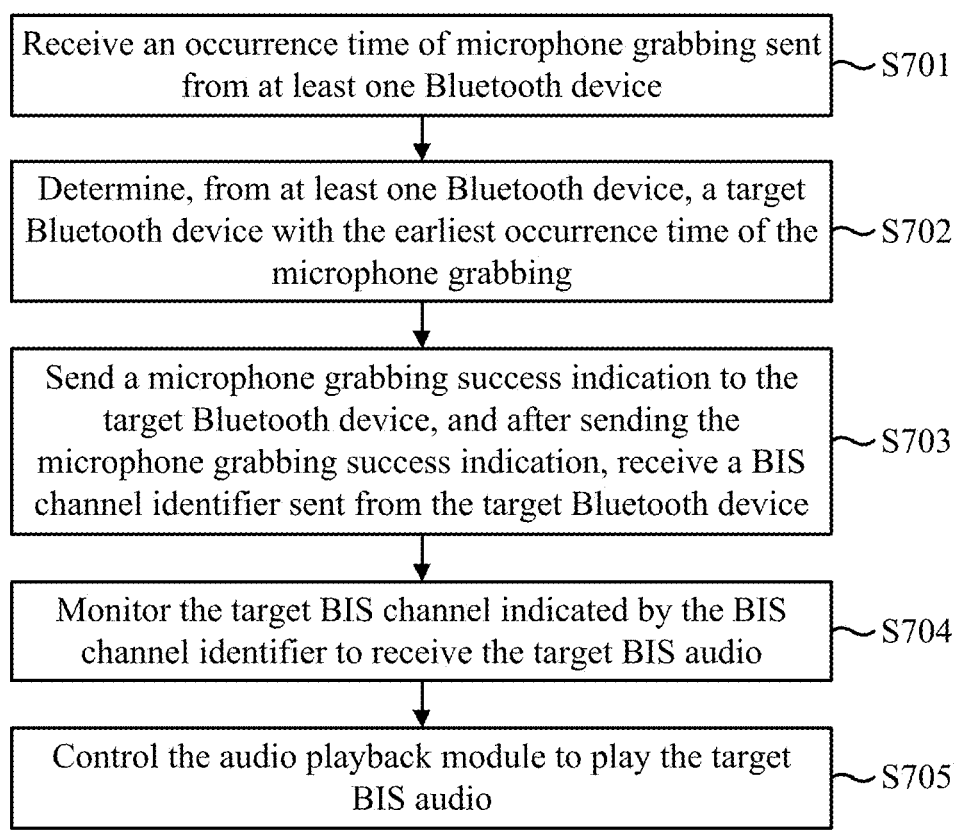

Receive an occurrence time of microphone grabbing sent from at least one Bluetooth device ~S701

Determine, from at least one Bluetooth device, a target Bluetooth device with the earliest occurrence time of the microphone grabbing ~S702

Send a microphone grabbing success indication to the target Bluetooth device, and after sending the microphone grabbing success indication, receive a BIS channel identifier sent from the target Bluetooth device ~S703

Monitor the target BIS channel indicated by the BIS channel identifier to receive the target BIS audio ~S704

Control the audio playback module to play the target BIS audio ~S705

FIG. 7

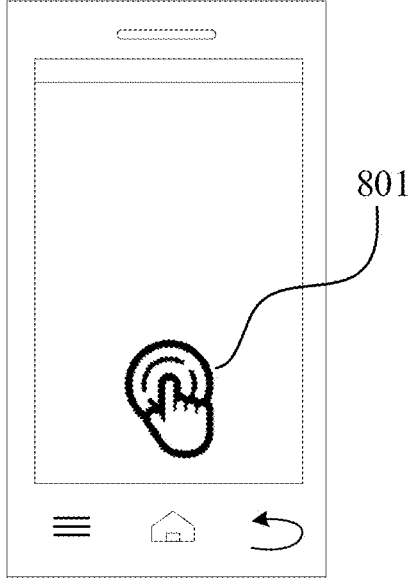

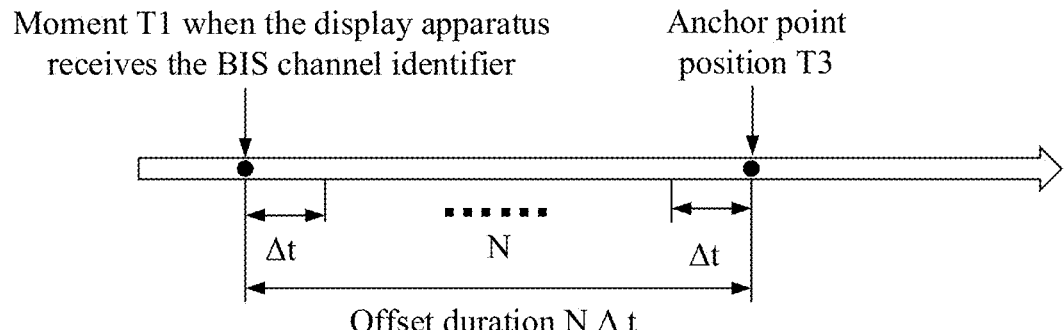
(a)
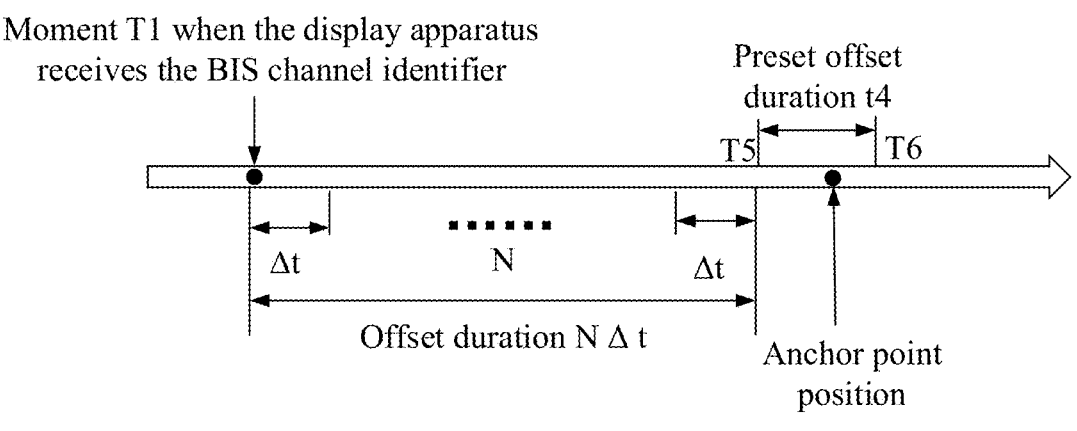
(b)
FIG. 10B
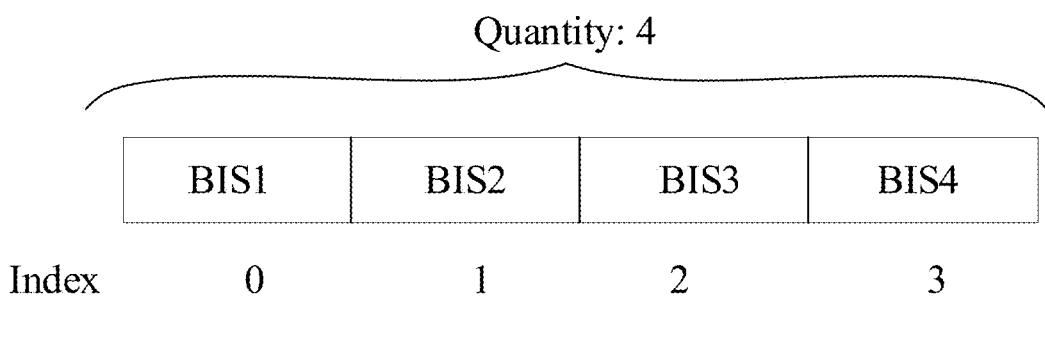
FIG. 10C

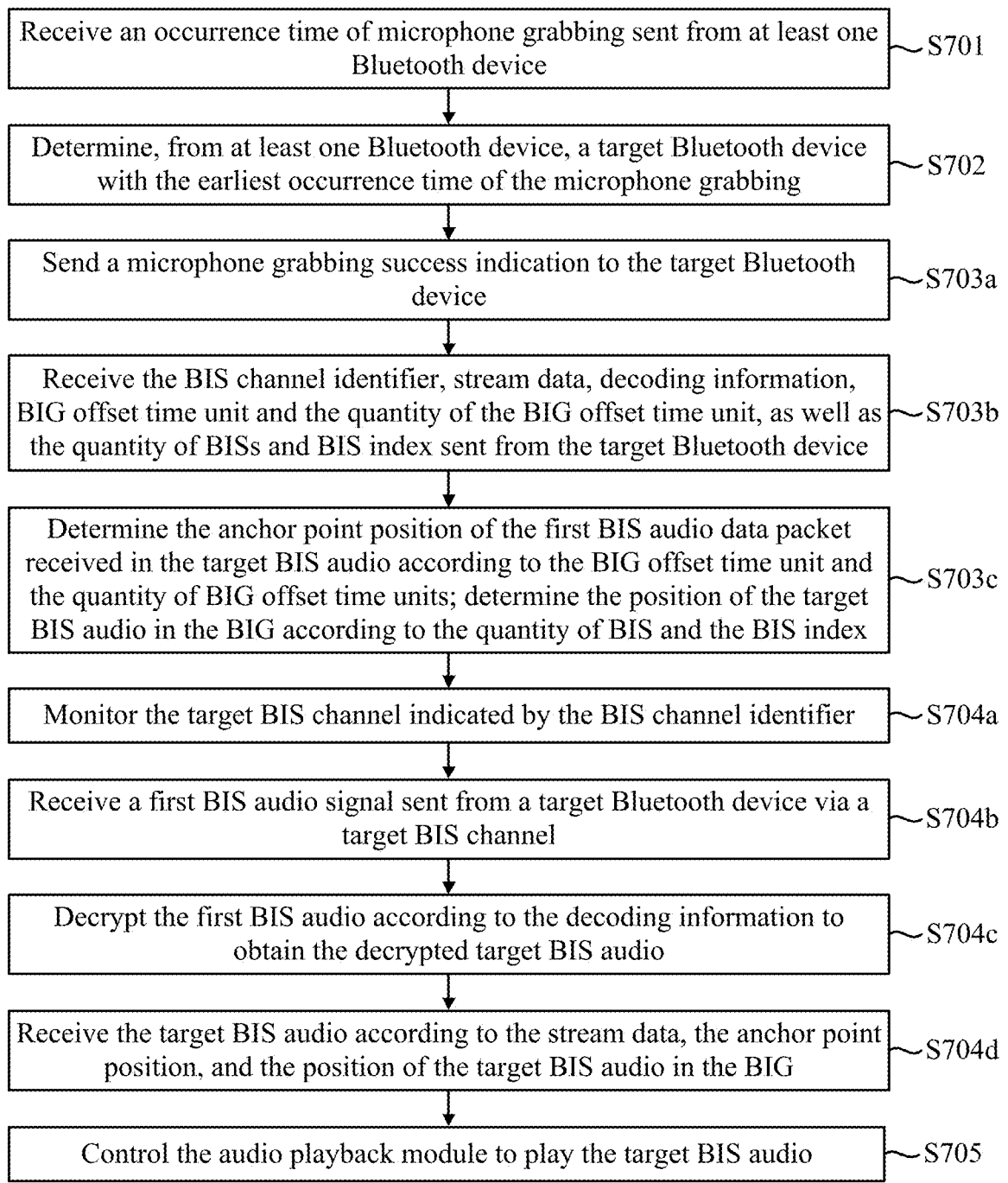

Receive an occurrence time of microphone grabbing sent from at least one Bluetooth device ～S701

Determine, from at least one Bluetooth device, a target Bluetooth device with the earliest occurrence time of the microphone grabbing ～S702

Send a microphone grabbing success indication to the target Bluetooth device ～S703a Receive the BIS channel identifier, stream data, decoding information, BIG offset time unit and the quantity of the BIG offset time unit, as well as the quantity of BISs and BIS index sent from the target Bluetooth device ～S703b Determine the anchor point position of the first BIS audio data packet received in the target BIS audio according to the BIG offset time unit and the quantity of BIG offset time units; determine the position of the target BIS audio in the BIG according to the quantity of BIS and the BIS index ～S703c Monitor the target BIS channel indicated by the BIS channel identifier ～S704a Receive a first BIS audio signal sent from a target Bluetooth device via a target BIS channel ～S704b Decrypt the first BIS audio according to the decoding information to obtain the decrypted target BIS audio ～S704c Receive the target BIS audio according to the stream data, the anchor point position, and the position of the target BIS audio in the BIG ～S704d Control the audio playback module to play the target BIS audio ～S705

FIG. 11

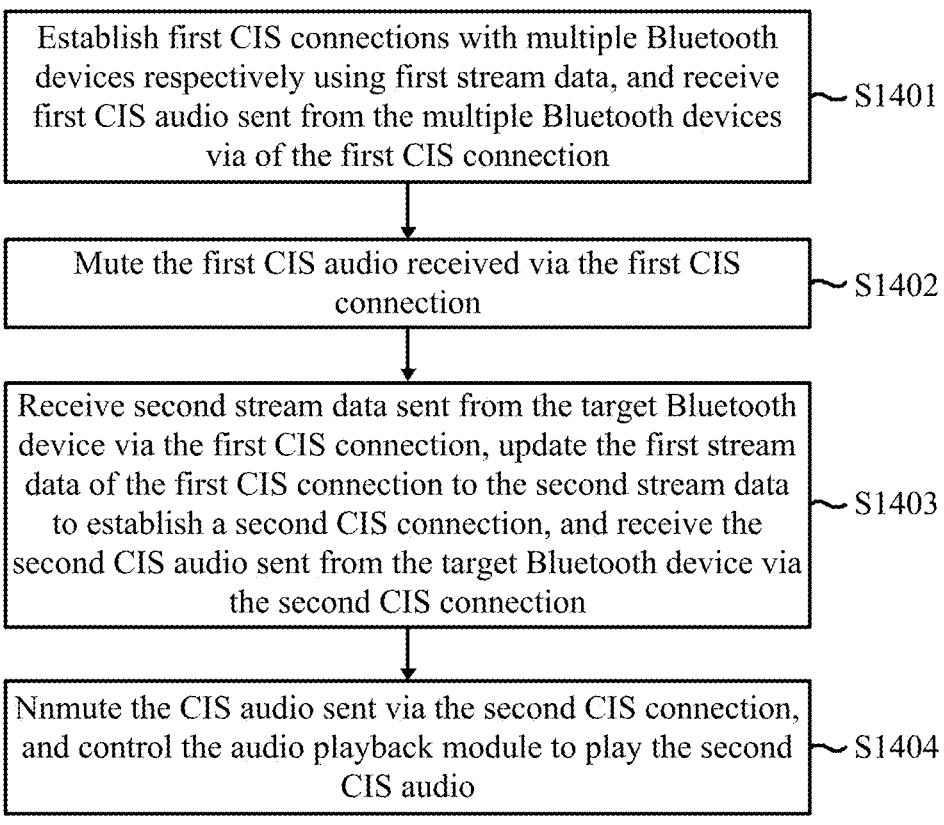

Establish first CIS connections with multiple Bluetooth devices respectively using first stream data, and receive first CIS audio sent from the multiple Bluetooth devices via of the first CIS connection ~S1401

Mute the first CIS audio received via the first CIS connection ~S1402

Receive second stream data sent from the target Bluetooth device via the first CIS connection, update the first stream data of the first CIS connection to the second stream data to establish a second CIS connection, and receive the second CIS audio sent from the target Bluetooth device via the second CIS connection ~S1403

Nnmute the CIS audio sent via the second CIS connection, and control the audio playback module to play the second CIS audio ~S1404

FIG. 14A

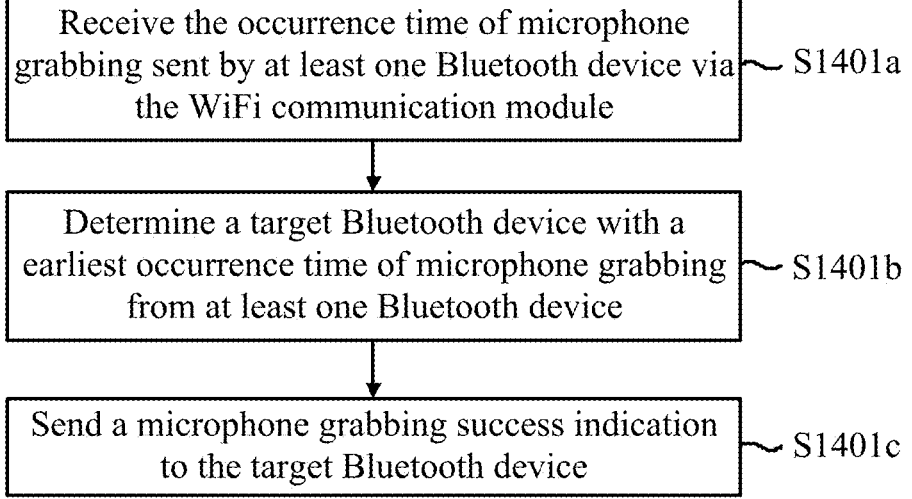

Receive the occurrence time of microphone grabbing sent by at least one Bluetooth device via the WiFi communication module ~S1401a Determine a target Bluetooth device with a earliest occurrence time of microphone grabbing from at least one Bluetooth device ~S1401b Send a microphone grabbing success indication to the target Bluetooth device ~S1401c

FIG. 14B

DISPLAY APPARATUS AND DATA PROCESSING METHOD

CROSS REFERENCES TO RELATED APPLICATIONS

This application is a continuation of International Application No. PCT/CN2023/085056, filed on Mar. 30, 2023, which claims priorities to Chinese Patent Application No. 202210771002.5, filed with the China National Intellectual Property Administration on Jun. 30, 2022, and Chinese Patent Application No. 202210772655.5, filed with the China National Intellectual Property Administration on Jun. 30, 2022, both of which are hereby incorporated by reference in their entireties.

TECHNICAL FIELD

The present application relates to the field of Bluetooth technology, and in particular to a display apparatus and a data processing method.

BACKGROUND

At present, TV, as a large-screen device in home scenes, brings users a better audio-visual experience. Users will cast multiple mobile phones onto the TV for playback via the large screen TV. In this process, the projection image data is transmitted between multiple mobile phones and the TV via WiFi, and the audio data is transmitted via Bluetooth. However, when the TV obtains the audio data from the mobile phone according to Bluetooth broadcast, it cannot know which channel the mobile phone will send the audio data from. Therefore, the TV needs to monitor all channels to receive the audio data, which results in high power consumption and high bandwidth resource utilization.

SUMMARY

The present application can provide a display apparatus, including: a display, configured to display images and/or user interfaces from a broadcast system and a network; an audio playback module, configured to play audio; a WiFi communication module, configured to communicate with an external device according to a WiFi protocol; a Bluetooth communication module, configured to communicate with an external device according to a Bluetooth protocol; a memory, configured to store computer instructions and data; at least one processor, connected with the audio playback module, the WiFi communication module, the Bluetooth communication module; where the at least one processor can be configured to execute the computer instructions to cause the display apparatus to perform: receiving an occurrence time of microphone grabbing sent from at least one Bluetooth device; determining a target Bluetooth device with a earliest occurrence time of microphone grabbing from the at least one Bluetooth device; sending a microphone grabbing success indication to the target Bluetooth device; receiving a Broadcast Isochronous Stream (BIS) channel identifier sent from the target Bluetooth device; monitoring a target BIS channel indicated by the BIS channel identifier to receive a target BIS audio; controlling the audio playback module to play the target BIS audio.

The present application can provide a Bluetooth device, including: a WiFi communication module, configured to send an occurrence time of microphone grabbing to a display apparatus; in a case that a microphone grabbing success indication sent from the display apparatus is received, sending a Broadcast Isochronous Stream (BIS) channel identifier to the display apparatus; a Bluetooth communication module, configured to send a target BIS audio to the display apparatus via a target BIS channel indicated by the BIS channel identifier, where the display apparatus can receive the target BIS audio by monitoring the target BIS channel indicated by the BIS channel identifier.

The present application provides a data processing method for a display apparatus, including: determining a target Bluetooth device with a earliest occurrence time of microphone grabbing from at least one Bluetooth device; sending a microphone grabbing success indication to the target Bluetooth device; receiving a Broadcast Isochronous Stream, BIS, channel identifier sent from the target Bluetooth device after sending the microphone grabbing success indication; monitoring a target BIS channel indicated by the BIS channel identifier to receive a target BIS audio; controlling an audio playback module to play the target BIS audio.

BRIEF DESCRIPTION OF FIGURES

FIG. 7 is a first flowchart of a BIS data transmission method according to an embodiment of the present application.

FIG. 8 is a schematic diagram of a user interface of at least one Bluetooth device according to an embodiment of the present application.

FIG. 10B is a schematic diagram of a time axis of an anchor point position according to an embodiment of the present application.

FIG. 10C is a schematic diagram of determining a target BIS audio according to an embodiment of the present application.

FIG. 11 is a second flowchart of a BIS data transmission method according to an embodiment of the present application.

FIG. 14A is a first flowchart of a CIS audio transmission method according to some embodiments of the present application.

FIG. 14B is a second flowchart of a CIS audio transmission method according to some embodiments of the present application.

DETAILED DESCRIPTION

Figure 1:
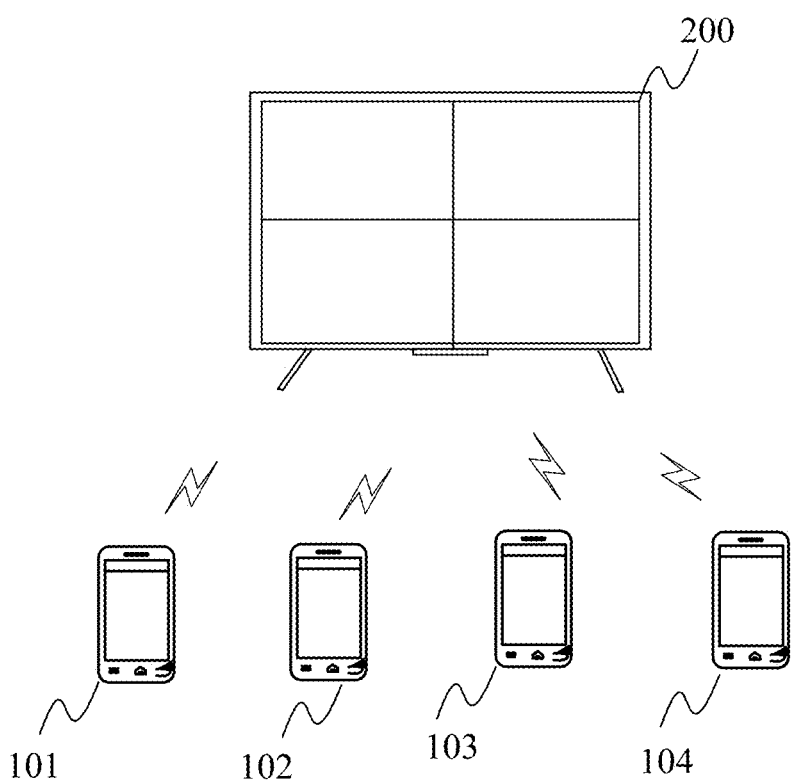
FIG. 1 is a schematic diagram of a scenario in which a display apparatus performs multi-channel screen projection.

In order to more clearly understand the above-mentioned objects, features and advantages of the present application, the scheme of the present application will be further described below. It should be noted that, in the absence of conflict, embodiments of the present application and the features therein may be combined with each other.

The display apparatus according to the present application is based on Bluetooth low energy audio (LE Audio) technology, and can have the following functions and features:

(1) Supports stereo in connected and unconnected states (broadcasting state);

(2) Use the Low Complexity Communication Codec (LC3) to provide better sound quality, even in low bit rate transmission environments, it can provide high-quality audio;

(3) It has a multi-stream feature that supports the transmission of multiple independent and synchronized audio streams between an audio source device and one or more audio receiving devices;

(4) It has the function of broadcasting audio, which can break via the point-to-point transmission function of Bluetooth and enable the audio source device to broadcast one or more audio streams to countless audio receiving devices, thus realizing a user experience based on individuals, locations, or even scenarios.

The present application is based on the situation that LE Audio supports stereo in a non-connected state (broadcast state). The non-connected state of LE Audio is a broadcast isochronous stream (BIS). BIS allows an audio source device to broadcast an audio stream to multiple audio receiving devices. Supports fixed or variable size BIS packets, using framed or unframed data or multiple packets on each BIS event. BIS does not require confirmation of a unidirectional data stream from an audio source device to an audio sink device. BIS packets can be retransmitted by increasing the quantity of sub-events in each BIS event to improve delivery reliability. Audio receiving devices within the permitted range of the broadcast audio can use two broadcast methods to join the broadcasting audio stream. One is open broadcast, which means that any receiving device within the range can receive the broadcast audio; the other is closed broadcast, which means that any receiving device within the range needs to enter a key to participate in the audio stream of the audio source device.

Based on the above description, the display apparatus and BIS audio transmission method in embodiments of the present application realize data transmission between the display apparatus and other Bluetooth devices in BIS mode according to Bluetooth low energy audio (LE Audio) technology.

Multi-channel screen projection can be understood as the simultaneous display and output of the images and sounds of multiple electronic terminal apparatuses (for example, mobile phones or tablets with smaller screens, etc.) on another display apparatus (for example, a TV with a larger screen). Since multi-channel screen projection is a mirrored screen projection, it has high requirements for the network environment and also has delays. During the experience, users may encounter problems such as screen freeze, blurred image quality, and poor sound quality.

For users who like to play games together during family gatherings, this feature can meet the needs of all gamers to watch games together. Usually, traditional screen projection is limited to one device projecting to the TV, so when playing games, if you want to watch other gamers' battles, you need to shift your sight to another apparatus, affecting the user's gaming experience. Based on multi-channel screen projection technology, the TV can play real-time game images from multiple apparatuses at the same time, allowing all game players to observe the battle situation of other players in real time.

As shown in FIG. 1, FIG. 1 is a schematic diagram of a scenario in which a display apparatus performs multi-channel screen projection. FIG. 1 can include at least one Bluetooth device: Bluetooth device 101, Bluetooth device 102, Bluetooth device 103, Bluetooth device 104, and display apparatus 200. In the aforementioned scenario in which multiple users play games together using the TV screen projection function, the above-mentioned Bluetooth devices 101, Bluetooth device 102, Bluetooth device 103, and Bluetooth device 104 send the displayed game screen and game audio to the display apparatus, so that the display apparatus can synchronously display the game screen of each Bluetooth device on the display in split screen and play the game audio.

However, when the display apparatus uses multi-channel screen projection technology to show the images and audios of multiple apparatuses, it can receive the projection image data sent from, other Bluetooth devices via the WiFi communication module to synchronously play the projection image data, and can receive the audio data sent from other Bluetooth devices via the Bluetooth communication module to synchronously output the audio data. Under normal circumstances, the delay in transmitting the projection image data using WiFi is 40 ms, while the delay in transmitting audio data using Bluetooth is about 50 ms, which will cause the audios and images on the display apparatus to be out of sync.

In related art, the first solution to solve the problem of audio and image asynchrony in a display apparatus is mainly to achieve Bluetooth connection via classical Bluetooth technology, and to implement encoding and decoding via SubBand Coding (SBC), and optimize the encoder to reduce the delay of Bluetooth audio data transmission. However, there is an upper limit to the performance optimization of the encoder, which cannot completely solve the problem of audio and image asynchrony in display apparatuses.

In order to solve the problem of unsynchronized audio and image on the above-mentioned display apparatus, the second solution can use LE Audio technology to reduce the delay of Bluetooth audio data transmission to achieve synchronization of audio and image on the display apparatus. Since the LE Audio technology in the second solution is implemented based on the Bluetooth Low Energy (BLE)

protocol, the Bluetooth transmission strategy is changed compared to the first solution which uses classic Bluetooth technology to achieve Bluetooth connection. The second solution also improves the encoding method, and improves the SBC method to the Low Complexity Communication Codec (LC3) method to achieve encoding and decoding, so it can effectively reduce the delay of Bluetooth transmission of audio data.

However, in the Bluetooth based low-power audio (LE Audio) technology of TV, when BIS sends and can receive broadcast information, the TV cannot know which channel other Bluetooth devices will send audio data from, so it needs to constantly monitor all channels to receive audio data, which has the problems of high power consumption and high bandwidth resource occupancy.

Figure 2:
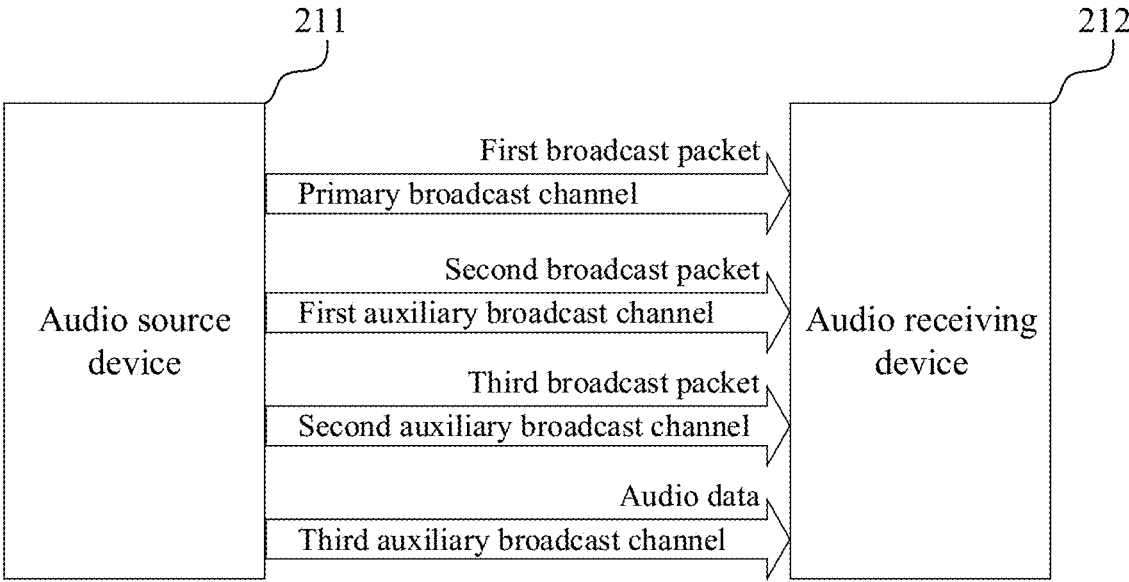
FIG. 2 is a schematic diagram of the working principle of BIS in the related art.

As shown in FIG. 2, FIG. 2 is a schematic diagram of the working principle of BIS in the related art. The figure can include an audio source device 211 and an audio receiving device 212. The working principle of BIS can include: the audio source device 211 first sends a first broadcast packet via any primary broadcast channel of Bluetooth, and the first broadcast packet can include first guidance information. The first guidance information can include audio data type information, which is used to instruct the audio source device to send the next broadcast packet (second broadcast packet) via the first auxiliary broadcast channel. Exemplarily, the data format of the first guidance information is an Advertising Set-ID. Then, the audio source device sends a second broadcast packet via the first auxiliary broadcast channel, where the second broadcast packet can include second guidance information. The second guidance information can include an audio data identifier, which is used to instruct the audio source device to send a third broadcast packet via a second auxiliary broadcast channel. Exemplarily, the data format of the second guidance information can be a Broadcast Audio Announcement Service Unique Identifier (Broadcast_ID). Further, the audio source device sends a third broadcast packet via the second auxiliary broadcast channel, and the third broadcast packet can include third guidance information. The third guidance information can include stream data, the stream data can include at least the sampling rate of the audio data, conditions of the left and right channels, the encoding format of the audio data and whether there is content protection. The third guidance information is used to instruct the audio source device to send audio data via a third auxiliary broadcast channel. Exemplarily, the data format of the third guidance information can be a Broadcast Audio Stream Endpoint structure, BASE.

It should be noted that Bluetooth operates in the 2.4 GHz frequency band, with a frequency range from 2402 MHz to 2480 MHz, one channel every 2 MHz, a total of 40 channels, of which 3 are primary broadcast channels and the remaining 37 are auxiliary broadcast channels. Usually, since there are fewer primary broadcast channels and resources are relatively tight, the initial guidance information (such as the first guidance information mentioned above) will be sent via the primary broadcast channel to indicate that subsequent broadcast packets will be sent in other auxiliary broadcast channels. In this way, other auxiliary broadcast channels will be used in subsequent transmissions and the resources of the primary broadcast channel will no longer be occupied.

It can be seen that, in the related art, the audio receiving device 212 needs to continuously monitor all broadcast channels to receive the first broadcast packet, which causes high power consumption of the audio receiving device, and continuous monitoring will occupy a large amount of bandwidth resources. In addition, based on the working principle diagram of the BIS shown in FIG. 2, it is necessary to monitor four broadcast channels in succession to obtain the real audio data. The process is cumbersome and has a large delay. In the scenario of multi-channel projection of the display apparatus, it will cause the audio and image to be out of sync, affecting the user experience.

In view of the above technical issues, the display apparatus according to the present application first can receive an occurrence time of microphone grabbing sent from at least one Bluetooth device via a WiFi communication module, where the occurrence time of microphone grabbing is sent from each Bluetooth device to the display apparatus via the WiFi communication module, and the occurrence time of the microphone grabbing represents the timing at which each Bluetooth device sends a signal to the display apparatus indicating the occurrence time of the microphone grabbing. After the display apparatus can receive the occurrence time of the microphone grabbing sent from at least one Bluetooth device via the WiFi communication module, the at least one processor determine the target Bluetooth device with the earliest occurrence time of the microphone grabbing from at least one Bluetooth device, and then after sending a microphone grabbing success indication to the target Bluetooth device via the WiFi communication module, can receive the BIS channel identifier sent from the target Bluetooth device, and further the Bluetooth communication module monitors the target BIS channel indicated by the BIS channel identifier to receive the target BIS audio, and then the at least processor control the audio playback module to play the target BIS audio. The display apparatus can interact with at least one Bluetooth device via a WiFi communication module, and can determine the target Bluetooth device therefrom, can receive the BIS channel identifier sent from the target Bluetooth device, and thereby only monitors the target BIS channel corresponding to the target Bluetooth device. In this way, when obtaining mobile audio data via Bluetooth broadcast interaction, the bandwidth resources consumed by monitoring are reduced, and more bandwidth resources are left to receive audio data, improving the speed and quality of receiving audio data and further enhancing the playback sound quality of display apparatuses.

Figure 3:
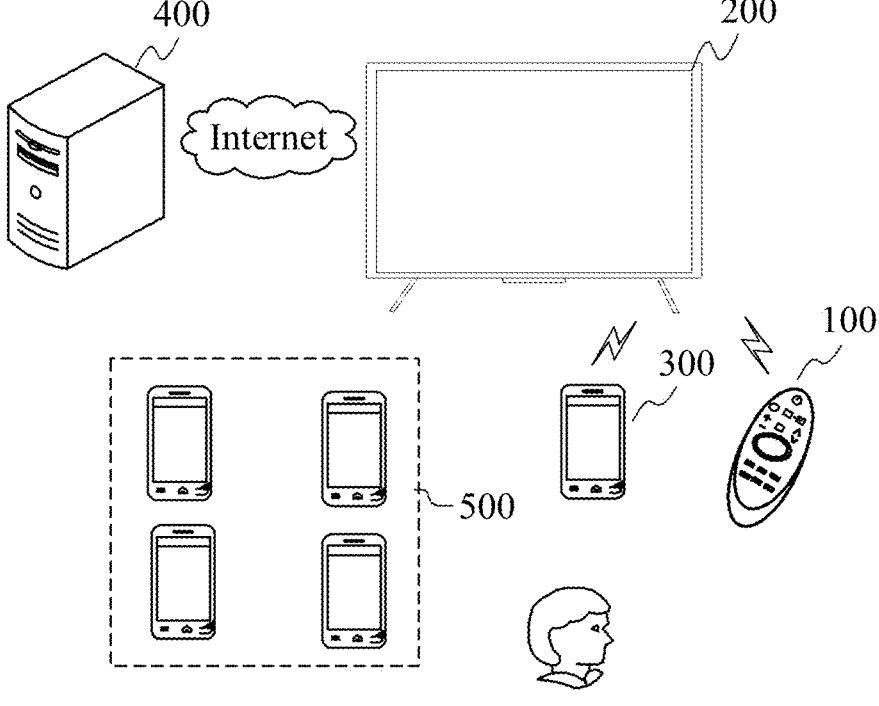
FIG. 3 is a schematic diagram of a scene according to some embodiments of the present application.

FIG. 3 is a schematic diagram of a scene according to some embodiments of the present application. As shown in FIG. 3, FIG. 3 can include a control device 100, a display apparatus 200, a smart apparatus 300, a server 400 and at least one Bluetooth device 500. Among them, the user can operate the display apparatus 200 via the smart apparatus 300 or the control device 100 to play audio and video resources on the display apparatus 200.

As shown in FIG. 3, taking the example of a user operating the display apparatus 200 via the control device 100, the user turns on the related functions of the WiFi communication module and the Bluetooth communication module configured in the display apparatus 200 via the control device 100. First, the display apparatus 200 can receive the occurrence time of microphone grabbing send by at least one Bluetooth device 500 via the WiFi communication module, and then the at least one processor can control the audio playback module to play the target BIS audio. The display apparatus can interact with at least one Bluetooth device via a WiFi communication module, and can determine the target Bluetooth device therefrom, can receive the BIS channel identifier sent from the target Bluetooth device, and thereby only monitors the target BIS channel corresponding to the target Bluetooth device. In this way, when obtaining mobile audio data via Bluetooth broadcast interaction, the bandwidth resources consumed by monitoring are reduced, and more bandwidth resources are left to receive audio data, improving the speed and quality of receiving audio data and further enhancing the playback sound quality of display apparatuses.

In some embodiments, the control device 100 may be a remote control device, and the communication between the remote control device and the display apparatus can include infrared protocol communication, Bluetooth protocol communication, and wireless or other wired methods to control the display apparatus 200. The user can control the display apparatus 200 by inputting user commands via buttons on the remote control, voice input, control panel input, etc. In some embodiments, a mobile terminal, a tablet computer, a computer, a laptop computer, and other smart apparatuses may also be used to control the display apparatus 200.

In some embodiments, at least one Bluetooth device 500 can install software applications with the display apparatus 200 to achieve connection communication via a network communication protocol to achieve the purpose of one-to-one control operation and data communication. The audio and video content displayed on at least one Bluetooth device 500 may also be transmitted to the display apparatus 200 to implement a synchronous display function. The display apparatus 200 also performs data communication with the server 400 via various communication methods. The display apparatus 200 may be allowed to be communicatively connected via a local area network (LAN), a wireless local area network (WLAN), and other networks. The server 400 may provide various contents and interactions to the display apparatus 200. The display apparatus 200 may be a liquid crystal display, an OLED display, or a projection display apparatus. In addition to providing a broadcast receiving TV function, the display apparatus 200 may also provide an intelligent network TV function that a computer supports.

Figure 4:
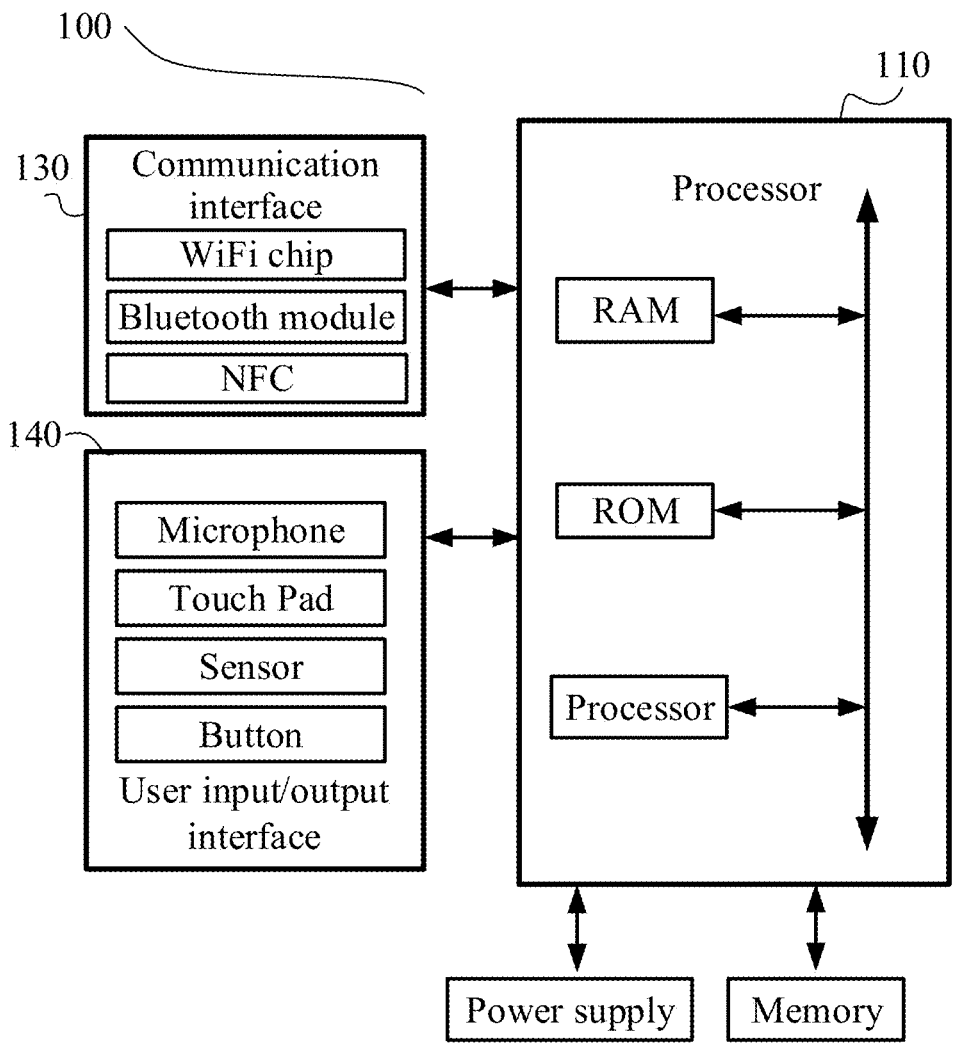
FIG. 4 is a configuration block diagram of a control device 100 according to an embodiment of the present application.

FIG. 4 is a configuration block diagram of a control device 100 according to an embodiment of the present application. As shown in FIG. 4, the control device 100 can include a processor 110, a communication interface 130, a user input/output interface 140, a memory, and a power supply. The control device 100 can receive operation commands input from users, and convert the operation commands into instructions that the display apparatus 200 can recognize and respond to, playing the role of an interactive intermediary between the user and the display apparatus 200. The communication interface 130 is used for communicating with the outside, and can include at least one of: a WiFi chip, a Bluetooth module, NFC or an alternative module. The user input/output interface 140 can include at least one of: a microphone, a touch pad, a sensor, a button, or alternative modules.

Figure 5:
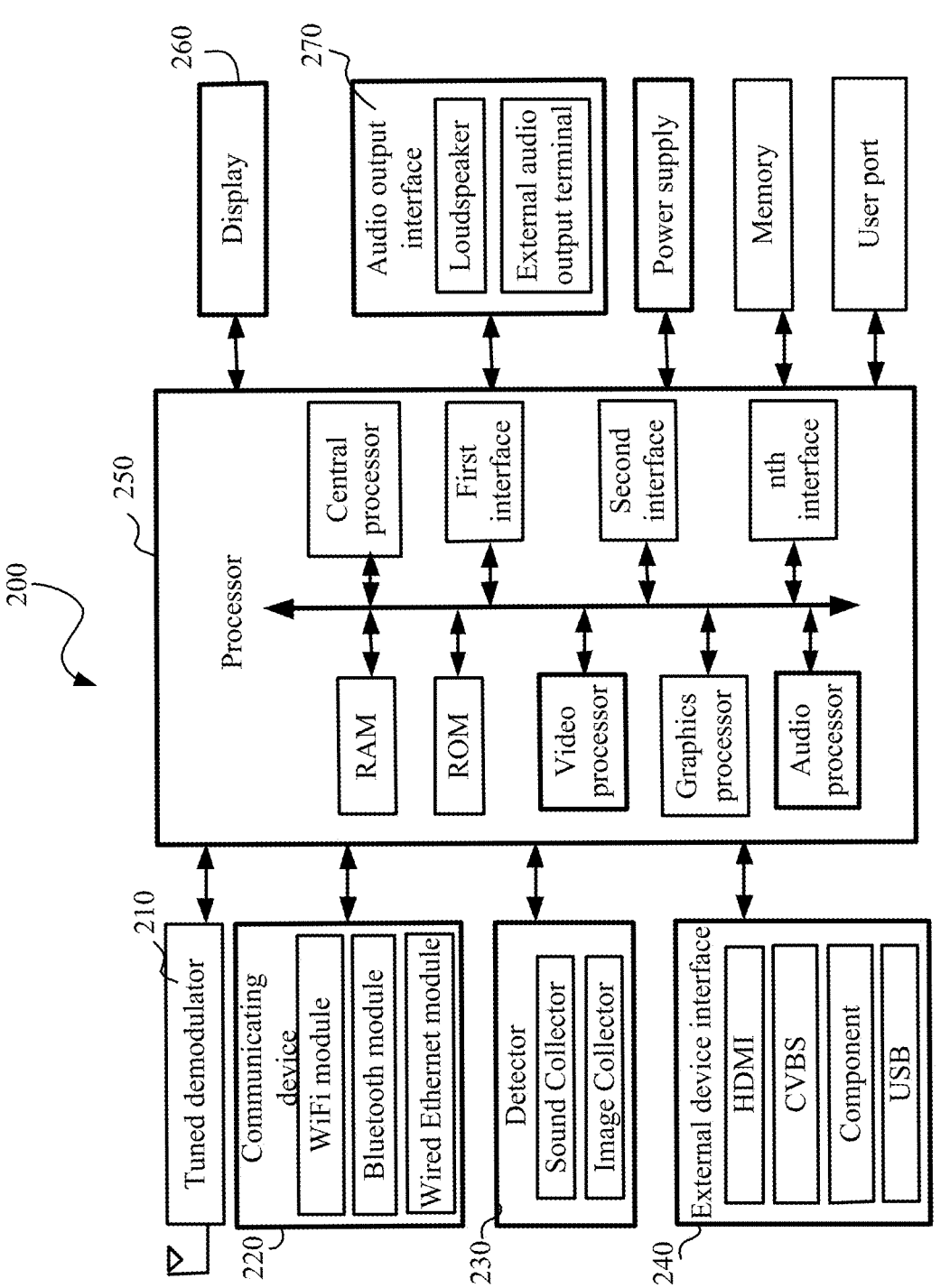
FIG. 5 is a hardware configuration block diagram of a display apparatus 200 according to an embodiment of the present application.

FIG. 5 is a hardware configuration block diagram of a display apparatus 200 according to an embodiment of the present application. As shown in FIG. 5, the display apparatus 200 can include a tuner-demodulator 210, a communicating device 220, a detector 230, an external device interface 240, a at least one processor, a display 260, an audio output interface 270, a memory, a power supply, and the like. The at least one processor can include at least one processor, for example, a central processing unit, a video processor, an audio processor, and a graphics processor. The memory may be a random access memory (RAM) or a read-only memory (ROM), which can be used to store computer instructions or commands and related data. The display 260 may be at least one of: a liquid crystal display, an OLED display, a touch display, and a projection display, and may also be a projection device and a projection screen.

The tuner-demodulator 210 can receive broadcast TV signals via wired or wireless reception, and can demodulate audio and video signals, such as an Electronic Program Guide (EPG) data signal, from a plurality of wireless or wired broadcast TV signals. The detector 230 can be used to collect signals from the external environment. The at least one processor and the tuner-demodulator 210 may be located in different separate devices, that is, the tuner-demodulator 210 may also be located in an external device of the main device where the at least one processor is located, such as an external set-top box.

In some embodiments, the above-mentioned display apparatus is a terminal apparatus with a display function, such as a TV, a mobile phone, a computer, a learning machine, etc.

In some embodiments, the at least one processor can control the operation of the display apparatus and responds to user operations via various software programs stored in the memory. The at least one processor can control the overall operation of the display apparatus 200. The user may input a user command via a graphical user interface (GUI) displayed on the display 260, and the user input interface can receive the user input command via the graphical user interface (GUI). Alternatively, the user may input a user command by inputting a specific sound or gesture, and the user input interface recognizes the sound or gesture via a sensor to receive the user input command.

An output interface (display 260 and/or audio output interface 270) can be configured to output user interaction information.

The communicating device 220 can be used to communicate with the server 400 or other devices.

In some embodiments of the present application, a display apparatus can include: a display configured to display images and/or user interfaces from a broadcast system and a network; an audio playback module configured to play audio.

In some embodiments, the audio playback module can include an audio track for receiving Bluetooth audio pulse code modulation (PCM) data, a sound encoding/mixing module, and an AMP (Audio Power Amplifier) that amplifies a low-power electronic audio signal from a sound source or a pre-amplifier to generate a current large enough to drive a speaker or headphone speaker to reproduce the sound.

A WiFi communication module can be configured to communicate with an external device according to a WiFi protocol, for example, to receive an occurrence time of microphone grabbing sent from at least one Bluetooth device.

The WiFi communication module can include a WiFi hardware physical module and WiFi software logic. The WiFi software logic can include a driver, a kernel, a WiFi Service for configuring and managing the WiFi communication module, a wireless security management software supplicant for controlling network selection, connection and configuration, etc. The WiFi communication module needs to meet the 802.11 WiFi protocol standards.

The Bluetooth communication module can be configured to communicate with an external device according to the Bluetooth protocol, for example, to monitor a target BIS channel indicated by a BIS channel identifier to receive target BIS audio.

In some embodiments, the Bluetooth communication module needs to meet the Core spec 5.2 standards.

A memory can be configured to store computer instructions and data.

The at least one processor can be connected with the display, the audio playback module, the WiFi communication module and memory, where the at least one processor can be configured to execute the computer instructions to cause the display apparatus to perform: determining a target Bluetooth device with a earliest occurrence time of microphone grabbing from at least one Bluetooth device; sending a microphone grabbing success indication to the target Bluetooth device; receiving a Broadcast Isochronous Stream, BIS, channel identifier sent from the target Bluetooth device after sending the microphone grabbing success indication; monitoring a target BIS channel indicated by the BIS channel identifier to receive a target BIS audio; controlling the audio playback module to play the target BIS audio.

It should be noted that the above-mentioned audio playback module can realize the same or similar functions as the audio output interface 270 shown in FIG. 5, and can be used to play audio. The WiFi communication module can realize the same or similar functions as the WiFi module in the communicating device 220 shown in FIG. 5, and can realize communication with other devices. The Bluetooth communication module can realize the same or similar functions as the Bluetooth module in the communicating device 220 shown in FIG. 5, and can realize communication with other devices. The above-mentioned processor(s) can realize the same or similar functions as the at least one processor shown in FIG. 5, and can be used to execute computer instructions.

The above-mentioned display apparatus can interact with at least one Bluetooth device via a WiFi communication module, and can determine the target Bluetooth device therefrom, can receive the BIS channel identifier sent from the target Bluetooth device, and thereby only monitors the target BIS channel corresponding to the target Bluetooth device. In this way, when obtaining mobile audio data via Bluetooth broadcast interaction, the bandwidth resources consumed by monitoring are reduced, and more bandwidth resources are left to receive audio data, improving the speed and quality of receiving audio data and further enhancing the playback sound quality of display apparatuses.

In some embodiments, the at least one processor can be further configured to: receive projection image data sent from multiple Bluetooth devices to receive multiple channels of projection image data; control the display to display the multiple channels of projection image data in split screen; receive the occurrence time of microphone grabbing sent from at least one Bluetooth device among multiple Bluetooth devices.

In some embodiments, after sending a microphone grabbing success indication, the at least one processor can receive the stream data sent from the target Bluetooth device; monitors the target BIS channel indicated by the BIS channel identifier, and can receive the target BIS audio according to the stream data. After sending the microphone grabbing success indication, the at least one processor can receive decoding information sent from the target Bluetooth device; monitors the target BIS channel indicated by the BIS channel identifier to receive the first BIS audio, decrypts the first BIS audio according to the decoding information, and obtains the decrypted target BIS audio.

In some embodiments, after sending the microphone grabbing success indication, the at least one processor can receive the synchronous broadcast group BIG offset time unit and a quantity of the BIG offset time units sent from the target Bluetooth device; can determine the anchor point position for receiving the first BIS audio data packet in the target BIS audio based on the BIG offset time unit and the quantity of the BIG offset time units; monitors the target BIS channel indicated by the BIS channel identifier, and can receive the target BIS audio based on the anchor point position.

In some embodiments, the at least one processor can determine the BIG offset duration based on the BIG offset time unit and the quantity of the BIG offset time units, and can determine that the anchor point position for receiving the first BIS audio data packet in the target BIS audio is after the BIG offset duration; or, the at least one processor can determine, according to the BIG offset duration and a preset offset duration, that the anchor point position for receiving the first BIS audio data packet in the target BIS audio is within the preset offset duration after the BIG offset duration.

In some embodiments, after sending the microphone grabbing success indication, the at least one processor can receive a quantity of BISs and a BIS index sent from the target Bluetooth device; can determine a position of the target BIS audio in the BIG according to the quantity of the BISs and the BIS index; monitors the target BIS channel indicated by the BIS channel identifier; and can receive the target BIS audio according to the position of the target BIS audio in the BIG.

Figure 6:
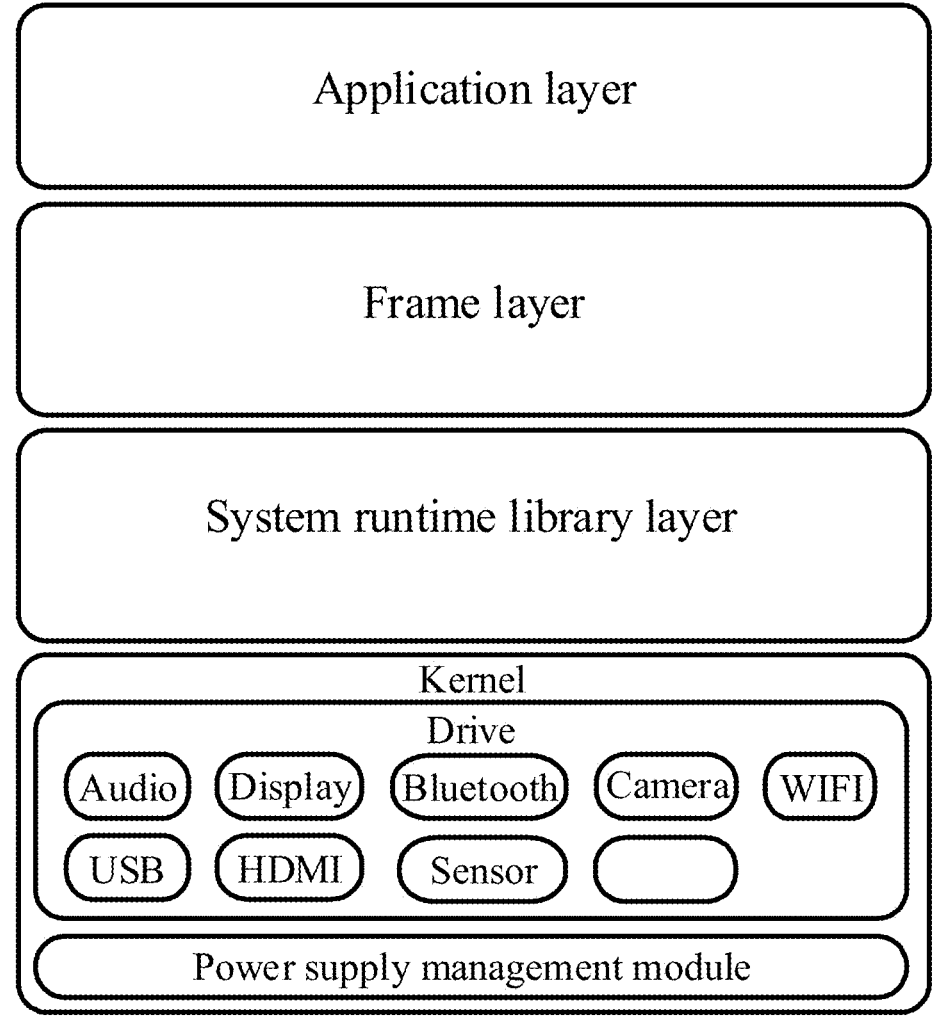
FIG. 6 is a software configuration schematic diagram of a display apparatus 200 according to an embodiment of the present application.

As shown in FIG. 6, FIG. 6 is a software configuration schematic diagram of a display apparatus 200 according to an embodiment of the present application. As shown in FIG. 6, the system can be divided into four layers, from top to bottom, respectively, the application layer (referred to as "application layer"), the application framework layer (referred to as "framework layer"), the Android runtime (Android runtime) and system library layer (referred to as "system runtime library layer"), and the kernel layer. The kernel layer can include at least one of the following drivers: audio driver, display driver, Bluetooth driver, camera driver, WIFI driver, USB driver, HDMI driver, sensor driver (such as fingerprint sensor, temperature sensor, pressure sensor, etc.), and power driver, etc. According to the embodiments of the present application, the video data transmission method can be implemented based on the above-mentioned display apparatus, and specifically can be implemented by a player in the display apparatus.

The present application provides a Bluetooth device, the Bluetooth device can include:

a WiFi communication module, configured to send an occurrence time of microphone grabbing to a display apparatus; after sending the occurrence time of microphone grabbing, in a case that a microphone grabbing success indication sent from the display apparatus is received, sending a Broadcast Isochronous Stream, BIS, channel identifier to the display apparatus;

a Bluetooth communication module, configured to send a target BIS audio to the display apparatus via a target BIS channel indicated by the BIS channel identifier, where the display apparatus can receive the target BIS audio by monitoring the target BIS channel indicated by the BIS channel identifier.

The above-mentioned Bluetooth device can interact with the display apparatus via the WiFi communication module and Bluetooth communication module, thereby transmitting the audio and video data displayed and output on the Bluetooth device to the large-screen display apparatus for synchronous playback. It is suitable for scenarios where multiple users play games together, and the fun of multi-channel screen projection is improved by setting up a microphone grabbing mechanism. The BIS channel identifier can be sent to the display apparatus to avoid the display apparatus from continuously monitoring all channels, reducing the power consumption of monitoring and the bandwidth resources occupied by monitoring, which can contribute to improving the BIS audio transmission rate and quality between the Bluetooth device and the display apparatus, and realizing the synchronization of audio and image when the Bluetooth device projects the image and outputs audio to the display apparatus, thereby improving the user experience.

As shown in FIG. 7, FIG. 7 is a first flowchart of the BIS data transmission method according to an embodiment of the present application, the method can include steps S701 to S705.

S701, receive an occurrence time of microphone grabbing sent from at least one Bluetooth device.

Among them, the occurrence time of microphone grabbing refers to the time when at least one Bluetooth device can receive the user's click on the "microphone grabbing" control on its own apparatus, and at least one Bluetooth device can package and send it to the display apparatus after determining the user's click on the "microphone grabbing" control. In the scenario where multiple users use multiple Bluetooth devices to play games together, it can be understood as the time when a user clicks on the "grab microphone" control on their Bluetooth device. When a user clicks on the "grab microphone" control, they expect the display apparatus to output audio data such as game sound effects or voice from their Bluetooth device.

As shown in FIG. 8, FIG. 8 is a schematic diagram of a user interface of at least one Bluetooth device according to an embodiment of the present application. In the figure, a "grab microphone" control 801 can be displayed at a corresponding position in the user interface. When the user clicks the "grab microphone" control 801, it triggers the sending of the occurrence time of microphone grabbing to the display apparatus. It should be noted that FIG. 8 is only an exemplary illustration, and the specific location of the "grab microphone" control is not specifically limited in the present application.

In some embodiments, before the display apparatus can receive the occurrence time of the microphone grabbing sent from at least one Bluetooth device, in order to meet the diversified audio-visual needs of users, the present application provides a technology based on multi-channel screen projection, where the display apparatus first can receive the projection image data sent from multiple Bluetooth devices to receive multiple channels of projection image data; then the display apparatus can control the display to show the multiple channels of projection image data in a split screen.

Figure 9:
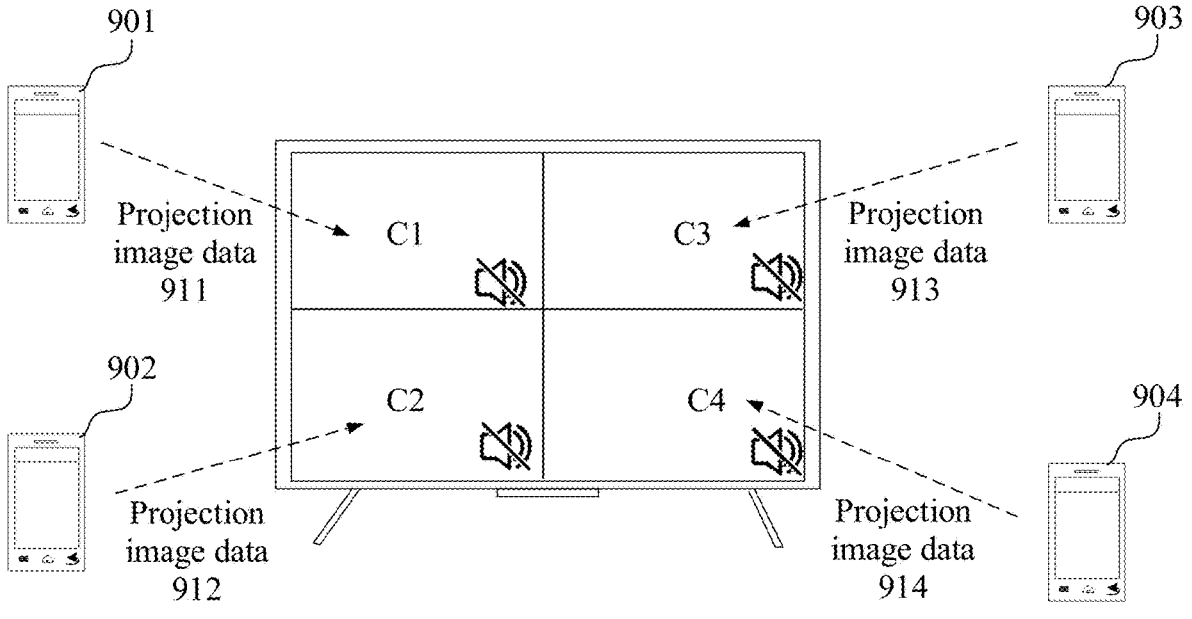
FIG. 9 is a first schematic diagram of a multi-channel screen projection according to an embodiment of the present application.

Exemplarily, as shown in FIG. 9, FIG. 9 is a schematic diagram of a multi-channel screen projection according to an embodiment of the present application, and FIG. 9 can include multiple Bluetooth devices: Bluetooth device 901, Bluetooth device 902, Bluetooth device 903, Bluetooth device 904, and a display apparatus. The display apparatus can receive the projection image data 911 sent from the Bluetooth device 901, the projection image data 912 sent from the Bluetooth device 902, the projection image data 913 sent from the Bluetooth device 903, and the projection image data 914 sent from the Bluetooth device 904, and then the display apparatus can control the display to display the multiple channels of projection image data in a split screen: the projection image data 911 is displayed in area C1, the projection image data 912 is displayed in area C2, the projection image data 913 is displayed in area C3, and the projection image data 914 is displayed in area C4. It should be noted that FIG. 9 is only an exemplary illustration, and the display positions of the projection image data corresponding to each Bluetooth device are not specifically limited in the present application.

It should be emphasized that the display apparatus can control the display to show multiple channels of projection image data in split screen, which can be understood as the display apparatus only displays the projection image data of multiple Bluetooth device. Each projection image data is silent because the audio data sent from multiple Bluetooth devices is not received. In order to meet the user's expectation of outputting audio data, after displaying the multiple channels of projection image data, the display apparatus can receive the occurrence time of the microphone grabbing sent from at least one Bluetooth device among the multiple Bluetooth devices via the WiFi communication module, thereby realizing the display of the projection image data of multiple Bluetooth devices on the display apparatus. And the display apparatus can receive the occurrence time of the microphone grabbing sent from at least one Bluetooth device to determine the target Bluetooth device, thereby enhancing the fun of multi-channel projection and improving the user experience.

In the above embodiments, the display apparatus can receive projection screen data sent from multiple Bluetooth devices, achieving multi-channel projection of the display apparatus and meeting the entertainment needs of users during gatherings with multiple people; receive the occurrence time of microphone grabbing sent from at least one Bluetooth device from multiple Bluetooth devices, enhance the interactivity and fun of multi-channel screen casting, determine the target Bluetooth device from at least one Bluetooth device, meet the speaking needs of the user corresponding to the target Bluetooth device, adapt to multi-user communication scenarios, and improve user experience.

S702, determine, from at least one Bluetooth device, a target Bluetooth device with the earliest occurrence time of the microphone grabbing.

In some embodiments, the display apparatus compares the occurrence time of microphone grabbing sent from at least one Bluetooth device, and can determine the Bluetooth device with the earliest occurrence time of microphone grabbing as the target Bluetooth device.

Continuing with the example in FIG. 9, Bluetooth device 901, Bluetooth device 902, Bluetooth device 903, and Bluetooth device 904 all send their respective occurrence time of the microphone grabbing to the display apparatus. Among them, the occurrence time of microphone grabbing of Bluetooth device 901 is 13:47:02, the occurrence time of microphone grabbing of Bluetooth device 902 is 13:47:29, the occurrence time of microphone grabbing of Bluetooth device 903 is 13:48:33, and the occurrence time of microphone grabbing of Bluetooth device 904 is 13:48:57. By comparing the occurrence time of microphone grabbing corresponding to the above-mentioned Bluetooth devices, it is determined that the earliest occurrence time of microphone grabbing is 13:47:02, and the corresponding Bluetooth device 901 is the target Bluetooth device.

In some embodiments, when there are multiple target Bluetooth devices among at least one Bluetooth device whose occurrence time of the microphone grabbing occurs earliest, any one of them is determined as the final target Bluetooth device; or, based on the priorities of multiple target Bluetooth devices, the one with the highest priority is determined as the final target Bluetooth device. For example, using the example in FIG. 9, the occurrence time of microphone grabbing of Bluetooth device 901 is 13:47:02, the occurrence time of microphone grabbing of Bluetooth device 902 is 13:47:02, the occurrence time of microphone grabbing of Bluetooth device 903 is 13:48:33, and the occurrence time of microphone grabbing of Bluetooth device 904 is 13:48:57. It can be seen that the earliest occurrence time of microphone grabbing is 13:47:02, which corresponds to two Bluetooth devices: Bluetooth device 901 and Bluetooth device 902. The priorities of the Bluetooth device 901 and the Bluetooth device 902 are further compared. When the priority of the Bluetooth device 901 is higher than the priority of the Bluetooth device 902, the Bluetooth device 901 is determined to be the target Bluetooth device.

In the above steps, by comparing the occurrence time of microphone grabbing sent from at least one Bluetooth device, the Bluetooth device with the earliest occurrence time is determined as the target Bluetooth device, enhancing the fun of multi-channel screen casting to meet the requirement of outputting audio data after successful microphone grabbing by the target Bluetooth device.

S703, send a microphone grabbing success indication to the target Bluetooth device, and after sending the microphone grabbing success indication, receive a Broadcast Isochronous Stream, BIS, channel identifier sent from the target Bluetooth device.

The Broadcast Isochronous Stream, BIS, channel identifier is used to identify the broadcast channel that the display apparatus needs to monitor.

S704, monitor the target BIS channel indicated by the BIS channel identifier to receive the target BIS audio.

In some embodiments, after determining the target Bluetooth device with the earliest occurrence time of the microphone grabbing from at least one Bluetooth device, the display apparatus sends a microphone grabbing success indication for indicating successful microphone grabbing to the target Bluetooth device, and further can receive a BIS channel identifier sent from the target Bluetooth device to accurately monitor the BIS channel identifier, thereby receiving the audio data sent from the target Bluetooth device.

As mentioned above, based on BIS, the display apparatus in the related art cannot know from which broadcast channel to obtain the audio data sent from the Bluetooth device, so it needs to monitor all 40 broadcast channels, which consumes a lot of power and occupies a lot of bandwidth resources. However, in the above embodiments of the present application, it is possible to accurately monitor the channel identifier indicated by the BIS channel identifier by obtaining the BIS channel identifier sent from the target Bluetooth device.

In some embodiments, after sending the microphone grabbing success indication, the display apparatus further can receive the stream data sent from the target Bluetooth device. The stream data can include at least one of the following: sampling rate, frame interval, data volume contained in each frame, and data rate. The stream data can be used to instruct the display apparatus how to receive and process the BIS audio sent from the subsequent target terminal apparatus. After receiving the stream data and BIS channel identifier sent from the target Bluetooth device, the display apparatus monitors the target BIS channel indicated by the BIS channel identifier, and can receive the target BIS audio according to the stream data.

In some embodiments, after sending the microphone grabbing success indication, the display apparatus further can receive decoding information sent from the target Bluetooth device. The decoding information can be used to decode the BIS audio sent from the target Bluetooth device.

After receiving the decoding information and BIS channel identifier sent from the target Bluetooth device, the display apparatus monitors the target channel indicated by the BIS channel identifier to receive the first BIS audio sent from the target Bluetooth device. To ensure the security of data transmission between the display apparatus and the target Bluetooth device, the first BIS audio is encrypted. Therefore, the display apparatus decrypts the first BIS audio according to the decoding information sent from the target Bluetooth device to obtain the decrypted target BIS audio.

In some embodiments, after sending the microphone grabbing success indication, the display apparatus further can receive a Broadcast Isochronous Group (BIG) offset time unit and a quantity of the BIG offset time units sent from the target Bluetooth device. Among them, in order to support the broadcast of one or more audio streams, LE Audio introduced BIG and BIS. A Broadcast Isochronous Group BIG can include multiple BISs.

Figure 10A:
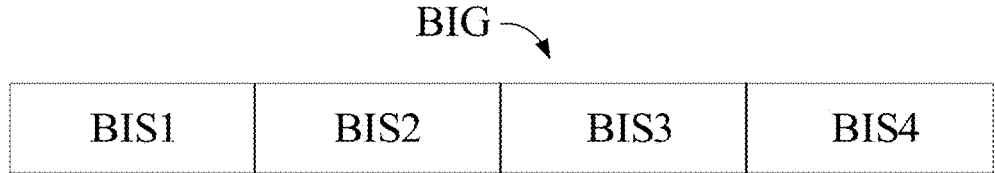
FIG. 10A is a schematic diagram of a BIG according to an embodiment of the present application.

As shown in FIG. 10A, FIG. 10A is a schematic diagram of a BIG according to an embodiment of the present application. The BIG shown in FIG. 10A can include a plurality of BISs, which are respectively identified as BIS1, BIS2, BIS3, and BIS4 in FIG. 10A. For example, if a mobile phone plays music via Bluetooth broadcasting, the left and right ears of the Bluetooth headset of each user who needs to listen to the music must also receive a synchronized data stream, so the data of the left and right ears must belong to the same BIG.

Among them, the BIG offset time unit and the quantity of the BIG offset time units are used to instruct the display apparatus to offset after receiving the BIS channel identifier, and the offset duration is the product of the quantity of the BIG offset time units N and the BIG offset time unit $\Delta t$, which can be understood as receiving the target BIS audio sent from the target display device after N $\Delta t$ intervals.

The anchor point position is used to indicate the moment when the BIG where the target BIS audio is located arrives at the display apparatus, that is, the start time of receiving the BIG. In some embodiments, the anchor position can be determined based on the time when the display apparatus receives the BIS channel identifier, as well as the BIG offset time unit and the quantity of the BIG offset time units. The anchor position can also be determined based on the time when the display apparatus receives the BIS channel identifier, the BIG offset time unit and the quantity of the BIG offset time units, and the preset offset duration.

In some embodiments, as shown in FIG. 10B, FIG. 10B is a schematic diagram of a time axis of an anchor point position according to an embodiment of the present application. FIG. 10B (a) can include the moment T1 when the display apparatus receives the BIS channel identifier, the BIG offset time unit $\Delta t$, and the quantity of the BIG offset time units N, then the offset duration t2=N*$\Delta t$. According to T1 and t2, the anchor point position T3=T1+t2 can be determined.

Alternatively, as shown in FIG. 10B (b), it can include: the moment T1 when the display apparatus receives the BIS channel identifier, the BIG offset time unit $\Delta t$, the quantity of the BIG offset time units N, the offset duration t2=N*$\Delta t$, and the preset offset duration t4, then as shown in FIG. 10B (b), the anchor point position is within the time range of [T5, T6], where T5=T1+t2, T6=T5+t4.

In the above embodiments, the display apparatus can synchronously receive the target BIS audio sent from the target Bluetooth device. The target Bluetooth device also needs to send the BIG offset time unit and the quantity of the BIG offset time units to the display apparatus, so that after the display apparatus receives the BIG offset time unit and the quantity of the BIG offset time units, it can determine the BIG offset duration according to the BIG offset time unit and the quantity of the BIG offset time units. It can be determined that the anchor point position of the first BIS audio data packet in the received target audio is after the BIG offset duration, such as the moment T3 shown in (a) in FIG. 10B.

The display apparatus can synchronously receive the target BIS audio sent from the target Bluetooth device. After the display apparatus receives the BIG offset time unit and the quantity of the BIG offset time units, it can also determine the BIG offset duration based on the BIG offset time unit and the quantity of the BIG offset time units, and then based on the BIG offset duration and the preset offset duration, the anchor position of the first BIS audio data packet in the received target audio can be determined to be within the preset offset duration after the BIG offset duration, as shown in the time range of [T5, T6] in (b) of FIG. 10B.

It can be understood that after receiving the BIS channel identifier, the display apparatus will receive the target BIS audio after a period of time. This period of time can be after the BIG offset duration, or within the preset offset duration after the BIG offset duration, thereby improving the error tolerance rate of sending and receiving the target BIS audio and ensuring that the display apparatus can receive the complete and accurate target BIS audio.

In some embodiments, the target BIS audio is one of the BIG. After sending the microphone grabbing success indication, the display apparatus can receive the quantity of BISs and BIS index sent from the target Bluetooth device. Firstly, the quantity of BISs and BIS index corresponding values are compared. If the BIS index value is less than or equal to the BIS quantity value, it is determined that the received BIS index is correct. Then, based on the BIS index, the position of the target BIS audio in the BIG is determined. After receiving the BIS channel identifier, the display apparatus monitors the target BIS channel indicated by the BIS channel identifier and accurately receive the target BIS audio based on its position in the BIG.

In some embodiments, as shown in FIG. 10C, FIG. 10C is a schematic diagram of determining a target BIS audio according to an embodiment of the present application. The BIG shown in FIG. 10C can include multiple BISs, which are respectively identified as BIS1, BIS2, BIS3, and BIS4 in FIG. 10C. The value corresponding to the quantity of BISs received by the display apparatus is 4, and the value corresponding to the BIS index is 1. The value corresponding to the BIS index is less than the value corresponding to the quantity of BISs. It can be determined that the BIS index is correct. The position of the target BIS audio in the BIG can be determined based on the BIS index: the target BIS audio is BIS2, which is the position of the second BIS in the BIG.

In other embodiments, in order to increase the rate of determining the target BIS audio, the display apparatus may first receive the BIS index (e.g., 0, 1, 2, 3) sent from the target Bluetooth device, and then determine the position of the target BIS audio in the BIG based on the BIS index (e.g., based on index 1, determine BIS2, that is, the position of the second BIS in the BIG).

As shown in FIG. 11, FIG. 11 is a second flowchart of a BIS data transmission method according to an embodiment of the present application. This embodiment is a further expansion and optimization based on the above embodiments, where an implementation of S703 can be as follows.

S703a, send a microphone grabbing success indication to the target Bluetooth device.

S703b, receive the BIS channel identifier, stream data, decoding information, BIG offset time unit and the quantity of the BIG offset time units, as well as the quantity of BISs and BIS index sent from the target Bluetooth device.

The BIS channel identifier can be used to identify the broadcast channel that the display apparatus needs to monitor.

The stream data can include at least one of the following: sampling rate, frame interval, data volume contained in each frame, and data rate; the stream data is used to indicate how the display apparatus receives and processes the BIS audio sent from the subsequent target terminal apparatus.

The decoding information can be used to decode the BIS audio sent from the target Bluetooth device.

The BIG offset time unit and the quantity of the BIG offset time units are used to instruct the display apparatus to perform an offset after receiving the BIS channel identifier, and the offset duration is the product of the quantity of the BIG offset time units N and the BIG offset time unit t.

The quantity of BISs and the BIS index are used to indicate the position of the BIS audio sent from the target Bluetooth device in the BIG.

S703c, determine the anchor point position of the first BIS audio data packet received in the target BIS audio according to the BIG offset time unit and the quantity of BIG offset time units; determine the position of the target BIS audio in the BIG according to the quantity of BISs and the BIS index.

Among them, the anchor point position is used to indicate the moment when the display apparatus receives the target BIS audio, which is determined based on the moment when the display apparatus receives the BIS channel identifier, the BIG offset time unit and the quantity of BIG offset time units. It can also be determined based on the moment when the display apparatus receives the BIS channel identifier, the BIG offset time unit and the quantity of BIG offset time units and the preset offset duration.

In some embodiments, S704 may include the following operations.

S704a, monitor the target BIS channel indicated by the BIS channel identifier.

S704b, receive a first BIS audio signal sent from a target Bluetooth device via a target BIS channel.

Among them, the first BIS audio is encrypted.

S704c, decrypt the first BIS audio according to the decoding information to obtain the decrypted target BIS audio.

S704d, receive the target BIS audio according to the stream data, the anchor point position, and the position of the target BIS audio in the BIG.

Determine the method of receiving the target BIS audio according to the stream data, determine the time of receiving the target BIS audio according to the anchor point position, and accurately receive the target BIS from the BIG according to the position of the target BIS audio in the BIG.

In the above embodiments, only the target BIS channel indicated by the BIS channel identifier needs to be monitored, which reduces power consumption and bandwidth resources occupied by monitoring, thereby reserving more bandwidth resources for receiving the target BIS audio. In addition, the display apparatus does not need to guide the monitoring of multiple channels, but directly monitors the target BIS channel to obtain stream data, decoding information, BIG offset time unit and the quantity of BIG offset time units, as well as the quantity of BISs and BIS index, so as to quickly determine the time, position, and receiving method of the target BIS audio reception, which is conducive to improving the reception rate and the quality of the received target BIS audio, so that the display apparatus can achieve audio and image synchronization and output higher quality audio.

S705, control the audio playback module to play the target BIS audio.

After the display apparatus receives the target BIS audio sent from the target Bluetooth device, it can control the audio playback module to play the target BIS audio, thereby satisfying the user's demand corresponding to the target Bluetooth device that the display apparatus outputs the target BIS audio, thereby improving the user experience.

Figure 12:
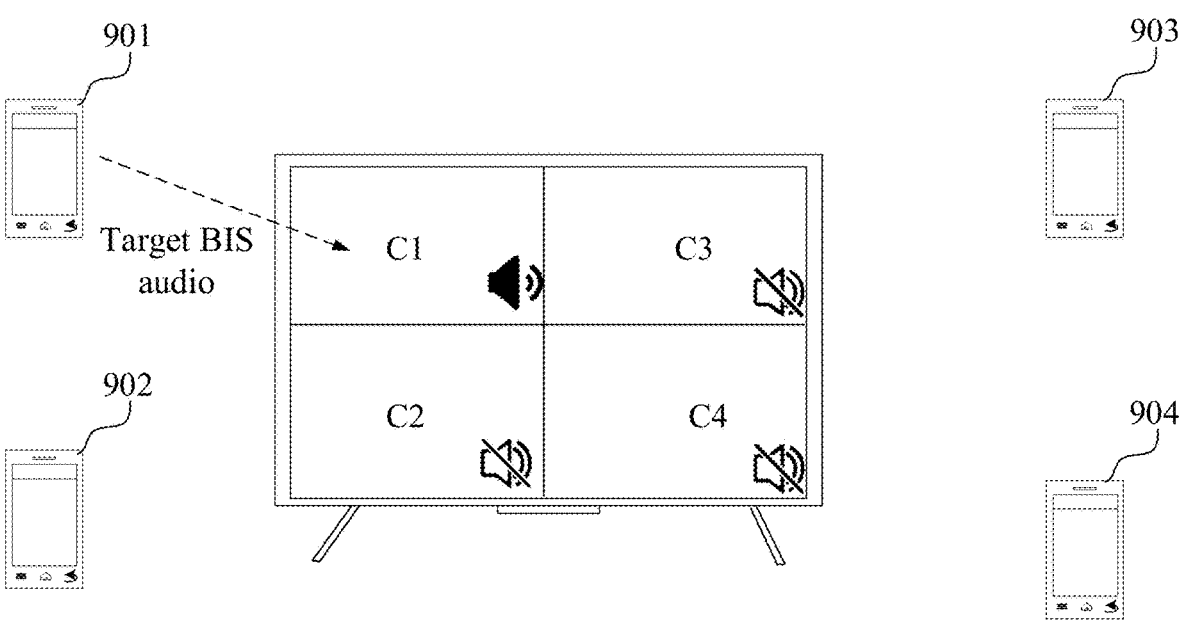
FIG. 12 is a second schematic diagram of a multi-channel screen projection according to an embodiment of the present application.

In some embodiments, following the schematic diagram of multi-channel screen projection shown in FIG. 9 above, the target Bluetooth device is Bluetooth device 901, and the display screen displays multi-channel screen projection data in split screens: projection image data 911, projection image data 912, projection image data 913, and projection image data 914. Furthermore, the schematic diagram of multi-channel screen projection shown in FIG. 9 is extended to FIG. 12. As shown in FIG. 12, it is a second schematic diagram of multi-channel screen projection according to an embodiment of the present application. The display apparatus plays the target BIS audio sent from Bluetooth device 901, which is manifested as only the projection area C1 corresponding to Bluetooth device 901 has both image output and target BIS audio output corresponding to the displayed image in projection area C1. The projection areas C2, C3, and C4 corresponding to other Bluetooth devices also output images, but there is no audio output corresponding to the image, and they are in a silent state.

In summary, in the BIS audio transmission method according to the present application, the display apparatus first receives the occurrence time of the microphone grabbing sent from at least one Bluetooth device, then can determine the target Bluetooth device with the earliest occurrence time of the microphone grabbing from at least one Bluetooth device, and after sending a microphone grabbing success indication to the target Bluetooth device, can receive the BIS channel identifier sent from the target Bluetooth device, further monitors the target BIS channel indicated by the BIS channel identifier to receive the target BIS audio, and then the at least one processor can control the audio playback module to play the target BIS audio. The display apparatus can interact with at least one Bluetooth device, determine the target Bluetooth device, receive the BIS channel identifier sent from the target Bluetooth device, and thus only monitors the target BIS channel corresponding to the target Bluetooth device. In this way, when obtaining mobile audio data via Bluetooth broadcast interaction, the bandwidth resources consumed by monitoring are reduced, and more bandwidth resources are left to receive audio data, improving the speed and quality of receiving audio data and further enhancing the playback sound quality of display apparatuses.

Figure 13:
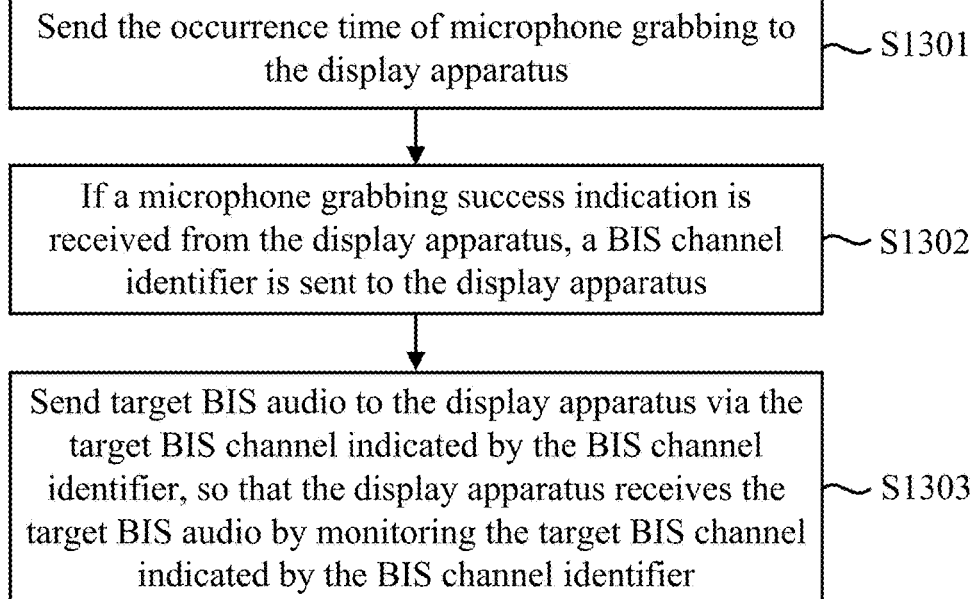
FIG. 13 is another flowchart of a BIS data transmission method according to an embodiment of the present application.

As shown in FIG. 13, FIG. 13 is another flowchart of the BIS data transmission method according to an embodiment of the present application, the method is applied to a Bluetooth device, and the method can include steps S1301 to S1303.

S1301, send the occurrence time of microphone grabbing to the display apparatus.

In some embodiments, referring to FIG. 8, the Bluetooth device triggers the sending of the occurrence time of microphone grabbing to the display apparatus according to the user's touch operation of the "microphone grabbing" control 801.

S1302, if a microphone grabbing success indication is received from the display apparatus, a BIS channel identifier is sent to the display apparatus.

In some embodiments, after receiving a microphone grabbing success indication sent from a display apparatus, the Bluetooth device sends a BIS channel identifier, stream data, decoding information, a BIG offset time unit and the quantity of BIG offset time units, as well as a quantity of BISs and a BIS index to the display apparatus.

S1303, send target BIS audio to the display apparatus via the target BIS channel indicated by the BIS channel identifier, so that the display apparatus can receive the target BIS audio by monitoring the target BIS channel indicated by the BIS channel identifier.

The above-mentioned embodiments of the present application are based on the fact that LE Audio supports stereo in a non-connected state (broadcast state), and implement data transmission between a display apparatus and other Bluetooth devices in a BIS mode. The present application also provides another embodiment based on the fact that LE Audio supports stereo in a connected state. In this embodiment, based on the display apparatus and Bluetooth device provided in the aforementioned embodiments, a connected isochronous stream (CIS) audio transmission method is provided to realize data transmission between the display apparatus and other Bluetooth devices in the CIS mode.

The following describes how to implement data transmission between a display apparatus and other Bluetooth devices in CIS mode.

Some embodiments of the present application are based on the situation that LE Audio supports stereo in connection state, where the connection state refers to a connection isochronous stream CIS, which is a point-to-point data transmission stream between a host and a specific slave (Slave, Link Layer), and is a two-way communication protocol with confirmation. CIS mode enables logical transport between connected apparatuses to transmit data on either side of an Asynchronous Connection Link (ACL). Each CIS can use fixed or variable data size and framed or unframed data, with single or multiple packets on each CIS event. CIS data stream can be transmitted unidirectionally or bidirectionally between apparatuses; and it uses protocols to improve the reliability of packet transmission in CIS.

In the process of the display apparatus connecting multiple Bluetooth devices based on CIS in low-energy audio (LE Audio) technology and waiting for one of the Bluetooth devices to send CIS audio, the CIS with large resource usage is used to connect multiple Bluetooth devices to ensure data transmission efficiency. The bandwidth resources consumed by multiple CIS connections are relatively large, and the remaining bandwidth resources are difficult to ensure high-quality CIS audio transmission, thereby affecting the sound quality of CIS audio transmission.

To solve the above technical problems, another embodiment of the present application provides a display apparatus, which can include a Bluetooth communication module and a processor. First, the Bluetooth communication module uses a first stream data with the bandwidth resource occupancy less than a preset resource amount to establish a first CIS connection with multiple Bluetooth devices respectively. Then, the first CIS audio received via the first CIS connection is muted, and then, the second stream data sent from the target Bluetooth device via the first CIS connection is received, the first stream data of the first CIS connection is updated to the second stream data to establish a second CIS connection, and the second CIS audio sent from the target Bluetooth device is received via the second CIS connection. Where the bandwidth resource occupancy corresponding to the second stream data is greater than or equal to the preset resource amount. Further, the mute of the second CIS audio is released, and the audio playback module is controlled to play the second CIS audio. The display apparatus establishes a first CIS connection with multiple Bluetooth devices via a first stream data that occupies less bandwidth resources, thereby reducing the bandwidth resources consumed by the Bluetooth CIS connection, and then updates to receive a second CIS audio via a second CIS connection that occupies more bandwidth resources, thereby achieving reception of CIS audio via sufficient bandwidth and improving the sound quality of CIS audio transmission.

Refer to FIG. 3, in another embodiment of the present application, taking the example of a user operating the display apparatus 200 via the control device 100, the user turns on the Bluetooth communication module configured in the display apparatus 200 by the control device 100. First, the Bluetooth communication component uses the first stream data with bandwidth resource occupancy less than the preset resource amount to establish the first CIS connection with multiple Bluetooth devices, respectively. Then, a first CIS audio received via the first CIS connection is muted, and then, second stream data sent from a target Bluetooth device via the first CIS connection is received, the first stream data of the first CIS connection is updated to second stream data to establish a second CIS connection, and second CIS audio sent from the target Bluetooth device is received via the second CIS connection, where the bandwidth resource occupancy corresponding to the second stream data is greater than or equal to the preset resource amount. Further, the mute of the second CIS audio is released, and the audio playback module is controlled to play the second CIS audio. The display apparatus establishes a first CIS connection with multiple Bluetooth devices via a first stream data that occupies less bandwidth resources, thereby reducing the bandwidth resources consumed by the Bluetooth CIS connection, and then updates to receive a second CIS audio via a second CIS connection that occupies more bandwidth resources, thereby achieving reception of CIS audio via sufficient bandwidth and improving the sound quality of CIS audio transmission.

It should be noted that in another embodiment of the present application, when data transmission between a display apparatus and other Bluetooth devices is implemented in the CIS mode, the configuration block diagram of the control device may refer to the contents related to FIG. 4 discussed in the aforementioned embodiment, and the hardware configuration block diagram of the display apparatus may refer to the contents related to FIG. 5 discussed in the aforementioned embodiment, which will not be described in detail here.

Based on the hardware configuration block diagram of the display apparatus shown in FIG. 5, a display apparatus is provided in another embodiment of the present application for implementing data transmission between the display apparatus and other Bluetooth devices in the CIS mode. The display apparatus can include:

a display configured to display images and/or a user interface from a broadcast system or network;

a Bluetooth communication module configured to communicate according to the Bluetooth protocol, for example, the Bluetooth communication module can be used to establish first CIS connections with multiple Bluetooth devices using first stream data, receive first CIS audio sent from multiple Bluetooth devices via the first CIS connection, and the bandwidth resource occupancy corresponding to the first stream data is less than a preset resource amount;

a memory configured to store computer instructions and data;

at least one processor connected with the display apparatus, the Bluetooth communication module and the memory, where the at least one processor is configured to execute the computer instructions to cause the display apparatus to perform: muting the first CIS audio received via the first CIS connection; receiving the second stream data sent from the target Bluetooth device by the first CIS connection; updating the first stream data of the first CIS connection to the second stream data to establish a second CIS connection; receiving the second CIS audio sent from the target Bluetooth device by the second CIS connection, where the bandwidth resource occupancy corresponding to the second stream data is greater than or equal to the preset resource amount; unmuting the CIS audio sent via the second CIS connection, and controlling the audio playback module to play the second CIS audio.

It should be noted that the above-mentioned Bluetooth communication module can realize the same or similar functions as the Bluetooth module in the communicating device 220 shown in FIG. 5, which will not be elaborated in the present application.

The above-mentioned display apparatus first establishes a first CIS connection with multiple Bluetooth devices via the first stream data with smaller resource occupancy, and mutes the CIS received via the first CIS connection to avoid the display apparatus outputting multiple CIS audios at the same time, affecting the user experience; receive the second stream data with larger resource occupancy sent from the target Bluetooth device via the first CIS connection, and updates the first stream data of the first CIS connection to the second stream data to establish a second CIS connection. Thus, the display device can receive CIS audio sent from the target Bluetooth device through a second CIS connection with a larger bandwidth, and further unmute the CIS audio to output high-quality CIS audio.

It can be understood that less bandwidth resources are consumed to maintain the first CIS connection with multiple Bluetooth devices. When the target device sends the second stream data, it means that the target Bluetooth device expects to output the CIS audio via the connection with the display apparatus, and thus it is adjusted to consume larger bandwidth resources to establish the second CIS connection between the target Bluetooth device and the display apparatus, thereby ensuring the transmission of high-quality CIS audio between the target Bluetooth device and the display apparatus. In addition, in multi-channel screen projection scenarios, it can ensure that the target Bluetooth device accurately outputs high-quality CIS audio, avoid noise, lag and other phenomena, and improve user experience.

In some embodiments of the present application, the at least one processor is further used to update the second stream data of the second CIS connection to the first stream data after detecting that the value of the CIE flag bit in the second CIS audio is the target value, so as to establish a first CIS connection between the display apparatus and the target Bluetooth device.

The display apparatus further can include: a WiFi communication module, which can be configured to communicate according to the WIFI protocol. For example, after the Bluetooth communication module establishes a first CIS connection with multiple Bluetooth devices using the first stream data, the occurrence time of the microphone grabbing sent from at least one Bluetooth device is received. The at least one processor can determine the target Bluetooth device with the earliest occurrence time of microphone grabbing from at least one Bluetooth device, and sends a microphone grabbing success indication to the target Bluetooth device; after sending the microphone grabbing success indication to the target Bluetooth device, can receive the first CIS audio and second stream data sent from the target Bluetooth device via the first CIS connection; updates the first stream data of the first CIS connection to the second stream data to establish a second CIS connection; and can receive the second CIS audio sent from the target Bluetooth device via the second CIS connection.

The display apparatus can receive projection image data sent from multiple Bluetooth devices to receive multiple channels of projection image data; can control the display to display the multiple channels of projection image data in split screen; after the display displays the multiple channels of projection image data in split screen, can receive the occurrence time of microphone grabbing sent from at least one Bluetooth device among the multiple Bluetooth devices.

It should be noted that the above-mentioned WiFi communication module can realize the same or similar functions as the WiFi module in the communicating device 220 shown in FIG. 5, and can communicate with other apparatuses according to the WIFI protocol.

In some embodiments of the present application, the first stream data can include: a sampling rate of 16 khz, a frame interval of 10 ms, a data volume of 40 bytes in each frame, and a data rate of 32 kbps; and/or, the second stream data can include: a sampling rate of 32 khz, a frame interval of 10 ms, a data volume of 80 bytes in each frame, and a data rate of 64 kbps.

In some embodiments of the present application, after the at least one processor detects that the value of the CIE flag bit in the second CIS audio is the target value, it can determine that the CIS audio transmission of the target Bluetooth device is completed and the bandwidth resources occupied by the second CIS connection are released; can determine the remaining duration of the current isochronous transmission duration, and can control the WiFi communication module to use the released bandwidth resources within the remaining duration.

Some embodiments of the present application further provide a Bluetooth device for realizing data communication with a display apparatus in CIS mode. The Bluetooth device can include: a Bluetooth communication module configured to: establish a first CIS connection with the display apparatus using first stream data; send second stream data to the display apparatus via the first CIS connection, where the bandwidth resource occupancy corresponding to the first stream data is less than a preset resource amount, and the bandwidth resource occupancy corresponding to the second stream data is greater than or equal to the preset resource amount; update to establish a second CIS connection with the display apparatus using second stream data, send second CIS audio to the display apparatus via the second CIS connection, so that the display apparatus can receive and plays the second CIS audio via the second CIS connection.

The above-mentioned Bluetooth device first establishes a first CIS connection with the display apparatus by the first stream data, and sends the second stream data to the display apparatus via the first CIS connection to instruct the display apparatus to switch to the second CIS connection established by the second stream data. The bandwidth resource occupancy of the second CIS connection is improved compared to the first CIS connection, and the sound quality of the CIS audio transmitted via the second CIS connection can be guaranteed while maintaining the connection between the display apparatus and other Bluetooth devices.

In some embodiments of the present application, the Bluetooth device further can include: a WiFi communication module, which is used to send the occurrence time of microphone grabbing to the display apparatus after the Bluetooth communication module and the display apparatus establish a first CIS connection using the first stream data. After receiving the microphone grabbing success indication sent from the display apparatus via the WiFi communication module, the Bluetooth communication module sends the first CIS audio and the second stream data to the display apparatus via the first CIS connection, updates to establish a second CIS connection with the display apparatus using the second stream data, and sends the second CIS audio to the display apparatus via the second CIS connection.

In some embodiments of the present application, the Bluetooth device sends the projection image data to the display apparatus so that the display apparatus can receive and displays the projection image data; after sending the projection image data to the display apparatus, the occurrence time of microphone grabbing is sent to the display apparatus.

The following will be specifically described in conjunction with the flowchart. It can be understood that the steps involved in the flowchart may include more steps or fewer steps during actual implementation, and the time order of these steps may also be different.

As shown in FIG. 14A, FIG. 14A is a first flowchart of a CIS audio transmission method according to some embodiments of the present application. The method can be applied to a display apparatus. The method can include the following steps S1401 to S1404.

S1401, establish first CIS connections with multiple Bluetooth devices respectively using first stream data, and receive first CIS audio sent from the multiple Bluetooth devices via the first CIS connection.

The bandwidth resource occupancy corresponding to the first stream data is less than the preset resource amount. The first stream data can include at least one of the following: sampling rate, frame interval, data volume contained in each frame, and data rate. The stream data is used to instruct the display apparatus how to receive and process the CIS audio sent from the subsequent target terminal apparatus. Among them, the preset resource amount is set according to actual needs, and this disclosure will not elaborate on it here.

In some embodiments, the first stream data can include: a sampling rate of 16 khz, a frame interval of 10 ms, a data volume of 40 bytes in each frame, and a data rate of 32 kbps. It should be noted that the setting of the above-mentioned first stream data is only an exemplary description and the present application does not limit this.

As shown in Table 1, Table 1 shows various parameters included in the stream data.

TABLE 1

| Stream data | Sampling rate/ khz | frame interval/ ms | data volume of in each frame/ byte | data rate/kbps |
|---|---|---|---|---|
| 8_1 | 8 | 7.5 | 26 | 27.734 |
| 8_2 | 8 | 10 | 30 | 24 |

TABLE 1-continued

| Stream data | Sampling rate/ khz | frame interval/ ms | data volume of in each frame/ byte | data rate/kbps |
| --- | --- | --- | --- | --- |
| 16_1 | 16 | 7.5 | 30 | 32 |
| 16_2 | 16 | 10 | 40 | 32 |
| 24_1 | 24 | 7.5 | 45 | 48 |
| 24_2^2 | 24 | 10 | 60 | 48 |
| 32_1 | 32 | 7.5 | 60 | 64 |
| 32_2 | 32 | 10 | 80 | 64 |
| 441_1 | 44.1 | 7.5 | 97 | 95.06 |
| 441_2 | 44.1 | 10 | 130 | 95.55 |
| 48_1 | 48 | 7.5 | 75 | 80 |
| 48_2 | 48 | 10 | 100 | 80 |
| 48_3 | 48 | 7.5 | 90 | 96 |
| 48_4 | 48 | 10 | 120 | 96 |
| 48_5 | 48 | 7.5 | 117 | 124.8 |

Figure 15:
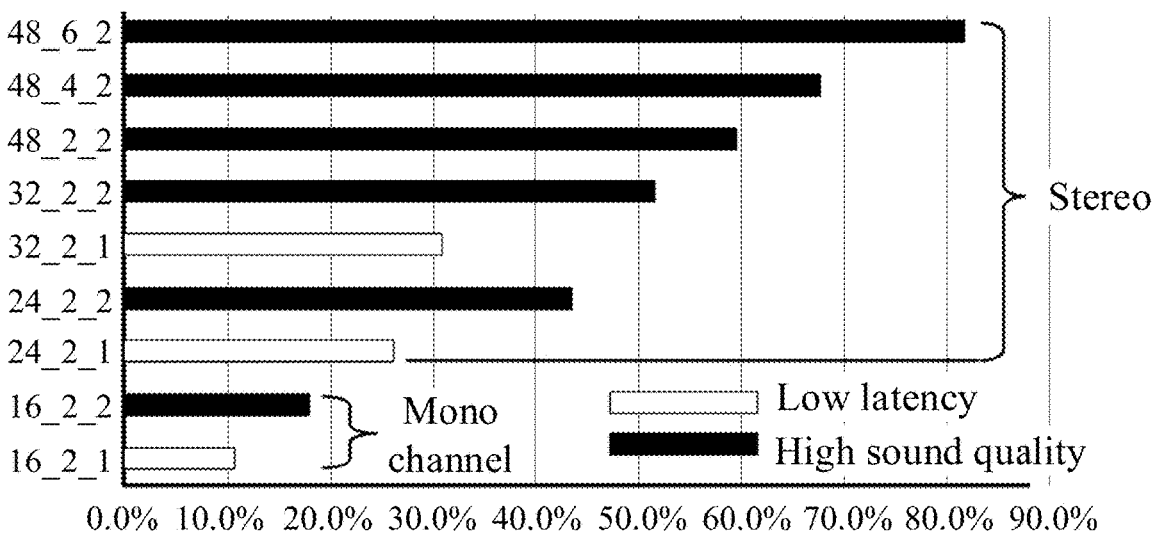
FIG. 15 is a schematic diagram of the bandwidth resource occupancy of stream data according to some embodiments of the present application.

As shown in FIG. 15, FIG. 15 is a schematic diagram of the bandwidth resource occupancy of stream data according to some embodiments of the present application. As shown in FIG. 15, when the stream data is 16_2_1, the bandwidth resource occupancy is 11%. It can be understood that when the multi-channel screen projection is four-channel screen projection, the first CIS connection between four mobile phones and TV is established via the first stream data 16_2_1, then the bandwidth resources occupied by the four mobile phones after connecting to the TV are less than 50%.

In some embodiments, as shown in FIG. 14B, FIG. 14B is a second flowchart of a CIS audio transmission method according to some embodiments of the present application. Step S601 may include the following steps S1401a to S1401c.

S1401a, receive the occurrence time of microphone grabbing sent from at least one Bluetooth device via the WiFi communication module.

S1401b, determine a target Bluetooth device with an earliest occurrence time of microphone grabbing from at least one Bluetooth device.

S1401c, send a microphone grabbing success indication to the target Bluetooth device. Among them, the description of the occurrence time of microphone grabbing and the determination of the target Bluetooth device according to the occurrence time of microphone grabbing in the multi-channel screen projection technology can refer to the aforementioned embodiments and will not be described in detail here.

S1402, mute the first CIS audio received via the first CIS connection.

In some embodiments, the display apparatus can receive CIS audio sent from multiple Bluetooth devices via the first CIS connection by the Bluetooth communication module. It can be understood that in a scenario where multiple people play games together and perform multi-channel screen projection on the display apparatus, multiple Bluetooth devices are connected with the display apparatus, and the display apparatus will evenly allocate bandwidth resources to receive the CIS audio sent from these multiple Bluetooth devices. The quantity of Bluetooth devices that need to be connected is large but the total bandwidth resources are limited, which requires that the bandwidth resources corresponding to each Bluetooth device are small. As mentioned above, the first CIS connection between four mobile phones and the TV is established via the first stream data 16_2_1. Then, for the scenario where four mobile phones (as Bluetooth devices) are connected with the TV (as a display apparatus), the bandwidth resources occupied after the connection are less than 50%, thereby ensuring the feasibility of multi-channel screen projection.

Since the bandwidth resources occupied via the first CIS connection are relatively small, when the display apparatus directly can receive CIS audio sent from multiple Bluetooth devices via the first CIS connection, it is difficult to ensure the efficiency of receiving the CIS audio and the sound quality of the received CIS audio, and there will be large delays, noise and other conditions. Therefore, after the display apparatus can receive the CIS audio sent from multiple Bluetooth devices via the first CIS connection, the CIS audio is muted to avoid delays, noise and other troubles caused by the output of the CIS audio, thereby improving the user's experience. It can be understood that the display apparatus does not output or play the CIS audio sent from multiple Bluetooth devices via the first CIS.

In some embodiments, as shown in FIG. 9, the display apparatus only displays multi-channel screen projection data and mutes the first CIS audio received via the first CIS connection, that is, does not output each first CIS audio received via the first CIS connection.

S1403, receive second stream data sent from the target Bluetooth device via the first CIS connection, update the first stream data of the first CIS connection to the second stream data to establish a second CIS connection, and receive the second CIS audio sent from the target Bluetooth device via the second CIS connection. Where the bandwidth resource occupancy corresponding to the second stream data is greater than or equal to the preset resource amount.

It should be noted that the display apparatus according to the present application is based on the CIS technology of LE Audio to reduce the delay in the CIS audio transmission process and ensure the synchronization of audio and picture of the display apparatus. It can maintain the CIS connection between the display apparatus and the target Bluetooth device. After receiving the second stream data, it does not disconnect the first CIS connection to re-establish the second CIS connection, but uses the second stream data sent via the first CIS connection to update the previous first stream data, thereby updating the first CIS connection to the second CIS connection. It can be understood that the display apparatus and the target Bluetooth device consistently maintain a connection state; thereby reducing the time consumed by disconnection and reconnection, and can improve the efficiency of CIS audio transmission, thereby achieving better audio and image synchronization effect.

In some embodiments, the second stream data may include: a sampling rate of 32 khz, a frame interval of 10 ms, a data volume of 80 bytes in each frame, and a data rate of 64 kbps. As shown in Table 1, various parameters included in the second stream data may also be set to other values. It should be noted that the second stream data is larger than the first stream data to ensure sufficient bandwidth to transmit high-quality CIS audio.

In some embodiments, referring to FIG. 14B, step S1403 may be after step S1401c. In some other embodiments, after sending a microphone grabbing success indication to the target Bluetooth device, the display apparatus can receive the second stream data sent from the target Bluetooth device via the first CIS connection, updates the first stream data of the first CIS connection to the second stream data to establish a second CIS connection, and can receive the CIS audio sent from the target Bluetooth device via the second CIS connection.

S1404, unmute the CIS audio sent via the second CIS connection, and control the audio playback module to play the second CIS audio.

The display apparatus initially mutes the first CIS audio sent via the first CIS connection. After the target Bluetooth device sends the second CIS audio via the second CIS connection, the display apparatus first uses the second stream data to receive the second CIS audio via the second CIS connection, and then unmutes the second CIS audio to avoid explosive sounds caused by sound quality jumps, and further can control the audio playback module to play the CIS audio to ensure a good audio-visual experience for users.

Figure 16A:
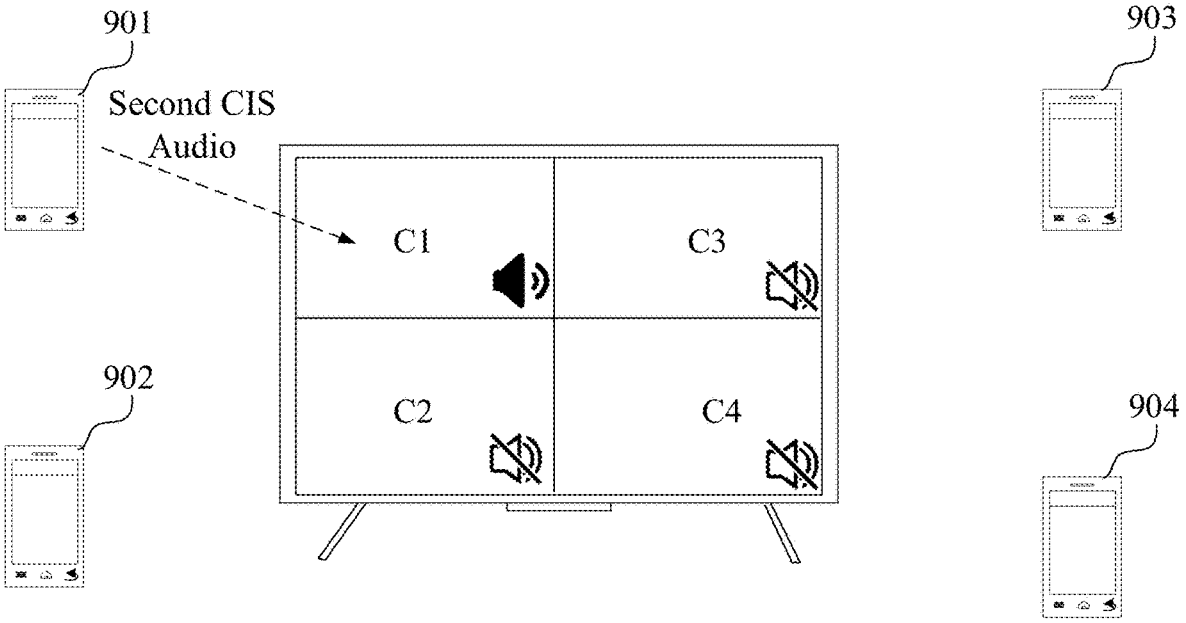
FIG. 16A is a schematic diagram of playing a second CIS audio according to some embodiments of the present application.

Continuing with the previous embodiments, as shown in FIG. 16A, FIG. 16A is a schematic diagram of playing a second CIS audio according to some embodiments of the present application. In FIG. 16A, the display apparatus unmutes the second CIS audio sent from the Bluetooth device 901 via the second CIS connection, and can control the audio playback module configured in the display apparatus to play the second CIS audio, while other Bluetooth devices 902, Bluetooth device 903 and Bluetooth device 904 are still connected with the display apparatus via the first CIS connection, and the first CIS audio sent from these Bluetooth devices via the second CIS connection is still muted.

In some embodiments, after detecting that the value of the CIE flag bit in the second CIS audio received via the second CIS connection is the target value, the CIS audio transmission of the target Bluetooth device is determined to be completed, and the bandwidth resources occupied by the second CIS connection are released.

Figure 16B:
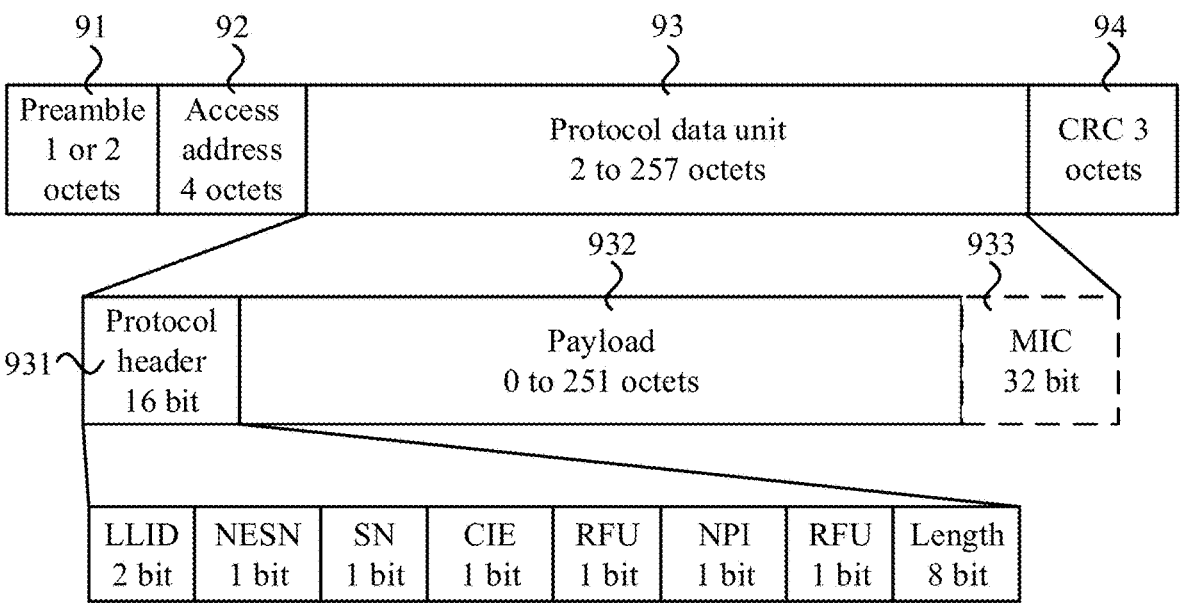
FIG. 16B is a schematic diagram of the data structure of the CIS protocol header.

FIG. 16B is a schematic diagram of the data structure of the CIS protocol header. As shown in FIG. 16B, the CIS can include: a preamble 91, an access address 92, a protocol data unit 93, and a cyclic redundancy checksum (CRC) 94.

The quantity of data bits of the preamble 91 is 1 or 2 octets, the quantity of data bits of the access address 92 is 4 octets, the quantity of data bits of the protocol data unit 93 ranges from 2 to 257 octets, and the quantity of data bits of the CRC is 3 octets. The protocol data unit 93 can include a protocol header 931, a payload 932, and a message integrity check code (MIC) 933. Among them, the quantity of data bits of the protocol header 931 is 16 bits, the quantity of data bits of the payload 932 ranges from 0 to 251 octets, when transmitted via LE 1M PHY25 (a low-power standard with a symbol rate of 1 Msps), the quantity of data bits of the message integrity check code 933 is 10 or 14 octets, when transmitted via LE 2M PHY25 (a low-power standard with a symbol rate of 2 Msps), the quantity of data bits of the message integrity check code 933 is 11 or 15 octets, and the quantity of data bits of the message integrity check code 933 depends on whether the message integrity check is included in the payload of the protocol data unit 93.

The protocol header 931 of the protocol data unit 93 further can include: a PDU type identifier (LLID), a next expected sequence number (NESN), a sequence number (SN), a close synchronization event bit (CIE), a reserved data bit (Reserved for Future Use, RFU) and a Y effective length (Length). Among them, there are two types of CIS transmitted in the CIS connection, one is data, called LL Data PDU, and the other is control information, called LL Control PDU. LLID is used to distinguish the type of CIS as data or control information; NESN and SN are used for acknowledgment and flow control during CIS transmission;

the effective length is used to indicate the quantity of data bits of valid data (the sum of the quantity of data bits of the payload and the MIC).

Among them, the Close Synchronization Event bit (CIE) is a data flag bit carried in the CIS audio protocol header. When the value of the CIE flag is 1, it indicates that the CIS audio has been sent successfully. When the value of the CIE flag is 0, it indicates that the CIS audio has not been sent successfully. The value of the CIE flag is the target value, that is, when the value of the CIE flag is 1, it is determined that the CIS audio transmission is completed.

Further, the remaining duration of the current isochronous transmission duration is determined, and the WiFi communication module can be configured to use the released bandwidth resources within the remaining duration. It can be understood that the display apparatus has completed the reception of CIS audio within a transmission cycle, thus releasing the bandwidth resources occupied by the Bluetooth communication module configured in the display apparatus, making it easier for the WiFi communication module to use this part of the bandwidth resources to transmit the projection image data within the remaining time of this transmission cycle, thereby improving the utilization rate of bandwidth resources and further ensuring the synchronization of audio and video of the display apparatus.

In some embodiments, after detecting that the value of the CIE flag bit in the second CIS audio is the target value, it is determined that the CIS audio transmission of the target Bluetooth device is completed, and the second stream data of the second CIS connection established between the display apparatus and the target Bluetooth device is updated to the first stream data to establish the first CIS connection between the display apparatus and the target Bluetooth device. It can be understood that after completing the transmission of the second CIS audio via the second CIS connection, it is updated back to the first CIS connection with a smaller bandwidth resource occupancy, so that other Bluetooth devices can transmit the CIS audio to the display apparatus.

According to the CIS audio transmission method according to some embodiments of the present application, first, the display device uses the first stream data with bandwidth resource occupancy less than the preset resource amount, and establishes the first CIS connection with multiple Bluetooth devices respectively. Then, the first CIS audio received via the first CIS connection is muted. The first CIS audio received via the first CIS connection with smaller bandwidth resources may have problems of large delay and poor sound quality. In order to avoid affecting the user experience, the first CIS audio received via the first CIS connection is muted. Then, the display device can receive the second stream data sent from the target Bluetooth device via the first CIS connection, updates the first stream data of the first CIS connection to the second stream data to establish a second CIS connection, and can receive the second CIS audio sent from the target Bluetooth device via the second CIS connection, where the bandwidth resource occupancy corresponding to the second stream data is greater than or equal to the preset resource amount; further, unmutes the second CIS audio, and can control the audio playback module to play the second CIS audio. The display apparatus first establishes a first CIS connection with multiple Bluetooth devices via a first stream data that occupies less bandwidth resources, thereby reducing the bandwidth resources consumed by the Bluetooth CIS connection, and then updates to receive a second CIS audio via a second CIS connection that occupies more bandwidth resources. On the one hand, the CIS connection between the target display apparatus and the Bluetooth device is maintained to avoid the delay caused by disconnection and reconnection. On the other hand, the first CIS connection that occupies less bandwidth resources is updated to the second CIS connection that occupies more bandwidth resources, thereby achieving reception of CIS audio via sufficient bandwidth and improving the sound quality of CIS audio transmission.

Figure 17:
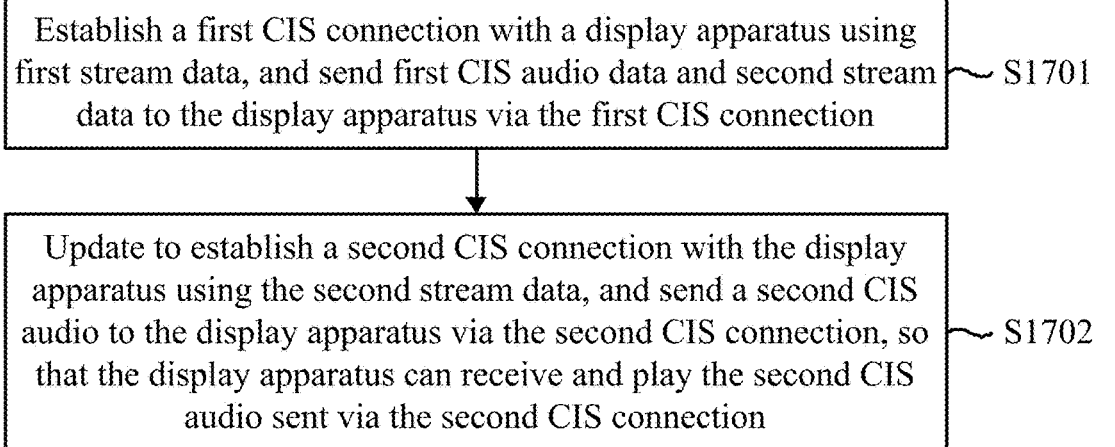
FIG. 17 is another flowchart of a CIS audio transmission method according to some embodiments of the present application.

As shown in FIG. 17, FIG. 17 is another flowchart of a CIS audio transmission method according to some embodiments of the present application, which is applied to a Bluetooth device. The method can include the following steps S1701 to S1702.

S1701, establish a first CIS connection with a display apparatus using first stream data, and send first CIS audio data and second stream data to the display apparatus via the first CIS connection.

The bandwidth resource occupancy corresponding to the first stream data is less than the preset resource amount. The first stream data can include a sampling rate of 16 kHz, a frame interval of 10 ms, a data volume of 40 bytes per frame, and a data rate of 32 kbps.

The bandwidth resource occupancy corresponding to the second stream data is greater than or equal to the preset resource amount. The second stream data can include: sampling rate of 32 khz, frame interval of 10 ms, data volume of 80 bytes per frame, data rate of 64 kbps.

S1702, update to establish a second CIS connection with the display apparatus using the second stream data, and send a second CIS audio to the display apparatus via the second CIS connection, so that the display apparatus can receive and play the second CIS audio sent via the second CIS connection.

It should be noted that the specific implementations of the above method can refer to the implementations in the aforementioned embodiments, which will not be repeated here.

Figure 18:
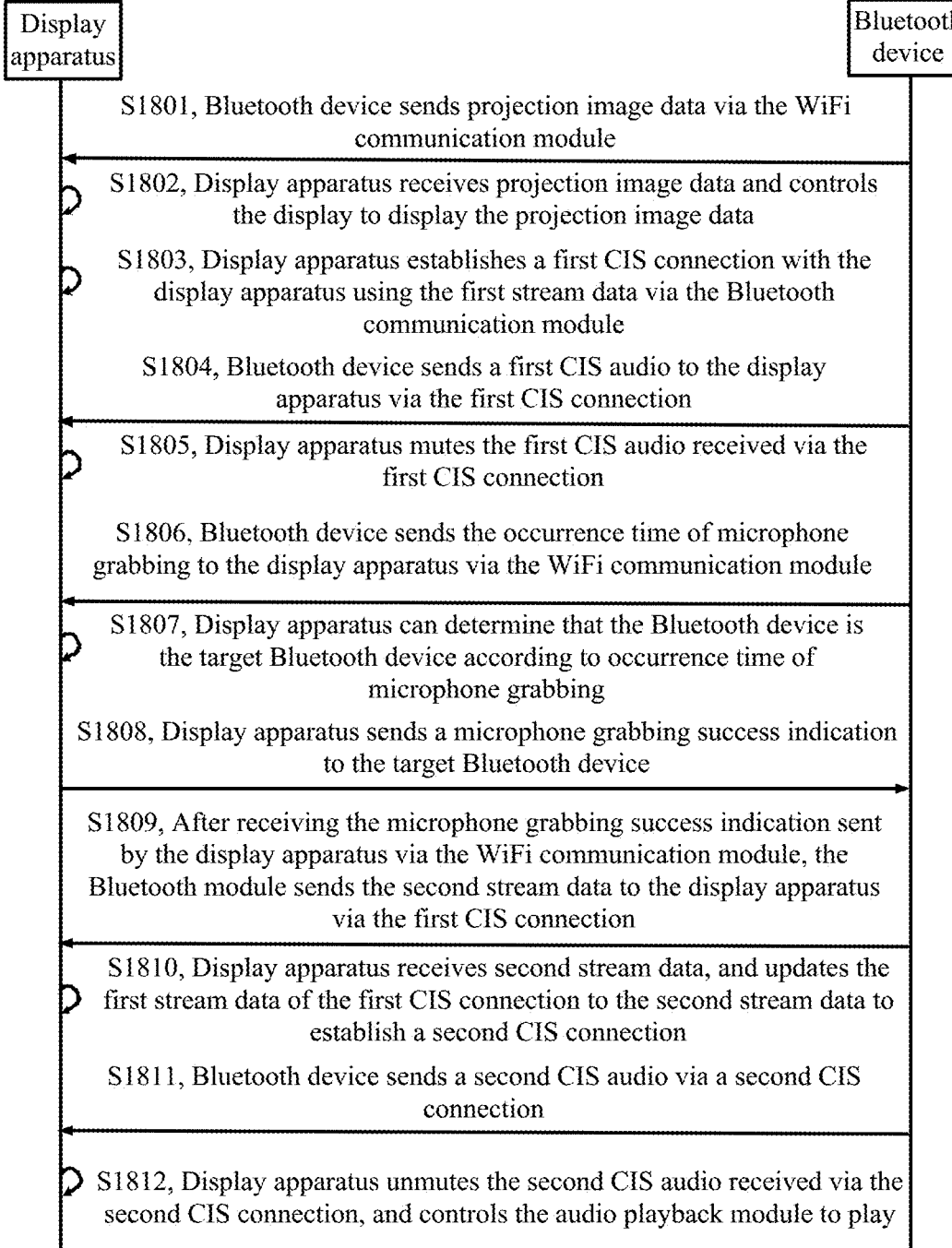
FIG. 18 is a third flowchart of a CIS audio transmission method according to some embodiments of the present application.

As shown in FIG. 18, FIG. 18 is a third flowchart of a CIS audio transmission method according to some embodiments of the present application. The method can include the following steps S1801 to S1812.

S1801, the Bluetooth device sends projection image data via the WiFi communication module.

S1802, the display apparatus receives projection image data and controls the display to display the projection image data.

S1803, the display apparatus establishes a first CIS connection with the display apparatus using the first stream data via the Bluetooth communication module.

S1804, the Bluetooth device sends a first CIS audio to the display apparatus via the first CIS connection.

S1805, the display apparatus mutes the first CIS audio received via the first CIS connection.

S1806, the Bluetooth device sends the occurrence time of microphone grabbing to the display apparatus via the WiFi communication module.

S1807, the display apparatus can determine that the Bluetooth device is the target Bluetooth device according to occurrence time of microphone grabbing.

S1808, the display apparatus sends a microphone grabbing success indication to the target Bluetooth device.

S1809, after receiving the microphone grabbing success indication sent from the display apparatus via the WiFi communication module, the Bluetooth device sends the second stream data to the display apparatus via the first CIS connection.

S1810, the display apparatus receives second stream data, and updates the first stream data of the first CIS connection to the second stream data to establish a second CIS connection.

S1811, the Bluetooth device sends a second CIS audio via a second CIS connection.

S1812, the display apparatus unmutes the second CIS audio received via the second CIS connection, and controls the audio playback module to play.

Embodiments of the present application provide a computer-readable non-volatile storage medium, on which a computer program is stored. When the computer program is executed by a processor, the various processes of the above-mentioned BIS data transmission method are implemented, and the same technical effect can be achieved. To avoid repetition, it will not be repeated here.

The computer-readable storage medium may be a read-only memory (ROM), a random access memory (RAM), a magnetic disk or an optical disk, etc.

For the convenience of explanation, the above description has been made in conjunction with specific implementation methods. However, the above discussion of some embodiments is not intended to be exhaustive or to limit the implementations to the precise forms disclosed above. Many modifications and variations are possible in light of the above teachings. The selection and description of the above embodiments are for better explaining the principles and practical applications, so that those skilled in the art can better use the embodiments and various modified embodiments suitable for specific use considerations.

What is claimed is:

1. A display apparatus, comprising:
a display, configured to display images and/or user interfaces from a broadcast system and a network;
an audio playback module, configured to play audio;
a WiFi communication module, configured to communicate with an external device according to a WiFi protocol;
a Bluetooth communication module, configured to communicate with an external device according to a Bluetooth protocol;
a memory, configured to store computer instructions and data;
at least one processor, connected with the display, the audio playback module, the WiFi communication module, the Bluetooth communication module and the memory;
wherein the at least one processor is configured to execute the computer instructions to cause the display apparatus to perform:
determining a target Bluetooth device with a earliest occurrence time of microphone grabbing among at least one Bluetooth device;
sending a microphone grabbing success indication to the target Bluetooth device;
receiving a Broadcast Isochronous Stream (BIS) channel identifier sent from the target Bluetooth device;
receiving a Broadcast Isochronous Group (BIG) offset time unit and a quantity of the BIG offset time units sent from the target Bluetooth device;
determining an anchor point position for receiving a first BIS audio data packet in the target BIS audio according to the BIG offset time unit and the quantity of the BIG offset time units;
monitoring a target BIS channel indicated by the BIS channel identifier to receive a target BIS audio;

receiving the target BIS audio according to the anchor point position; and controlling the audio playback module to play the target BIS audio.

2. The display apparatus according to claim 1, wherein the at least one processor is further configured to execute the computer instructions to cause the display apparatus to perform:

receiving multiple channels of projection image data sent from multiple Bluetooth devices;

display the multiple channels of projection image data in a split screen form on the display;

receiving an occurrence time of microphone grabbing sent from the at least one Bluetooth device among the multiple Bluetooth devices.

3. The display apparatus according to claim 1, wherein the at least one processor is further configured to execute the computer instructions to cause the display apparatus to perform:

receiving stream data sent from the target Bluetooth device;

monitoring the target BIS channel indicated by the BIS channel identifier; and receiving the target BIS audio according to the stream data.

4. The display apparatus according to claim 1, wherein the at least one processor is further configured to execute the computer instructions to cause the display apparatus to perform:

receiving decoding information sent from the target Bluetooth device;

monitoring the target BIS channel indicated by the BIS channel identifier to receive a first BIS audio; and decrypting the first BIS audio to obtain the target BIS audio according to the decoding information.

5. The display apparatus according to claim 1, wherein the at least one processor is further configured to execute the computer instructions to cause the display apparatus to perform:

determining BIG offset duration according to the BIG offset time unit and the quantity of the BIG offset time units, and determining that the anchor point position for receiving the first BIS audio data packet in the target BIS audio is after the BIG offset duration;

or, determining BIG offset duration according to the BIG offset time unit and the quantity of the BIG offset time units; and determining, according to the BIG offset duration and a preset offset duration, that the anchor point position for receiving the first BIS audio data packet in the target BIS audio is within the preset offset duration after the BIG offset duration.

6. The display apparatus according to claim 1, wherein the at least one processor is further configured to execute the computer instructions to cause the display apparatus to perform:

receiving a quantity of BISs and a BIS index sent from the target Bluetooth device;

determining a position of the target BIS audio in a Broadcast Isochronous Group (BIG) according to the quantity of the BISs and the BIS index;

monitoring the target BIS channel indicated by the BIS channel identifier; and receiving the target BIS audio according to the position of the target BIS audio in the BIG.

7. A data processing method for a display apparatus, comprising:

determining a target Bluetooth device with a earliest occurrence time of microphone grabbing from at least one Bluetooth device;

sending a microphone grabbing success indication to the target Bluetooth device;

receiving a Broadcast Isochronous Stream (BIS) channel identifier sent from the target Bluetooth device;

receiving a Broadcast Isochronous Group (BIG) offset time unit and a quantity of the BIG offset time units sent from the target Bluetooth device;

determining an anchor point position for receiving a first BIS audio data packet in the target BIS audio according to the BIG offset time unit and the quantity of the BIG offset time units;

monitoring a target BIS channel indicated by the BIS channel identifier to receive a target BIS audio;

receiving the target BIS audio according to the anchor point position; and controlling an audio playback module to play the target BIS audio.

8. The data processing method according to claim 7, further comprises:

receiving multiple channels of projection image data sent from multiple Bluetooth devices;

display the multiple channels of projection image data in a split screen form on the display;

receiving an occurrence time of microphone grabbing sent from the at least one Bluetooth device among the multiple Bluetooth devices.

9. The data processing method according to claim 7, further comprises:

receiving stream data sent from the target Bluetooth device;

monitoring the target BIS channel indicated by the BIS channel identifier; and receiving the target BIS audio according to the stream data.

10. The data processing method according to claim 7, further comprises:

receiving decoding information sent from the target Bluetooth device;

monitoring the target BIS channel indicated by the BIS channel identifier to receive a first BIS audio; and decrypting the first BIS audio to obtain the target BIS audio according to the decoding information.

11. The data processing method according to claim 7, further comprises:

determining BIG offset duration according to the BIG offset time unit and the quantity of the BIG offset time units, and determining that the anchor point position for receiving the first BIS audio data packet in the target BIS audio is after the BIG offset duration;

or, determining BIG offset duration according to the BIG offset time unit and the quantity of the BIG offset time units; and determining, according to the BIG offset duration and a preset offset duration, that the anchor point position for receiving the first BIS audio data packet in the target BIS audio is within the preset offset duration after the BIG offset duration.

12. The data processing method according to claim 7, further comprises:

receiving a quantity of BISs and a BIS index sent from the target Bluetooth device;

determining a position of the target BIS audio in a Broadcast Isochronous Group (BIG) according to the quantity of the BISs and the BIS index; monitoring the target BIS channel indicated by the BIS channel identifier; and receiving the target BIS audio according to the position of the target BIS audio in the BIG.

* * * * *